(12) United States Patent
Rouse et al.

(10) Patent No.: US 6,815,510 B2
(45) Date of Patent: Nov. 9, 2004

(54) ELASTOMER RECLAIMING COMPOSITION AND METHOD

(76) Inventors: Michael W. Rouse, 325 Fairways Dr., Vicksburg, MS (US) 39180; Victor M. Deeb, 81 Freemont St., Marlborough, MA (US) 01752; Morgan L. White, No. 5 McCall Cove, Vicksburg, MS (US) 39183; Magdy Abdelrahman, 1626 Old Glory Rd., Lincoln, NE (US) 68521

( * ) Notice: Subject to any disclaimer, the term of this patent is extended or adjusted under 35 U.S.C. 154(b) by 0 days.

(21) Appl. No.: 10/294,897

(22) Filed: Nov. 15, 2002

(65) Prior Publication Data

US 2003/0181547 A1 Sep. 25, 2003

Related U.S. Application Data

(60) Provisional application No. 60/334,097, filed on Nov. 30, 2001, provisional application No. 60/331,538, filed on Nov. 19, 2001, and provisional application No. 60/331,537, filed on Nov. 19, 2001.

(51) Int. Cl.⁷ .............................................. C08C 19/08
(52) U.S. Cl. ......................... 525/383; 521/44; 521/41; 521/43.5; 521/45; 524/64; 524/71; 524/270
(58) Field of Search ..................... 521/44, 41, 43.5, 521/45; 524/64, 71, 270; 525/383

(56) References Cited

U.S. PATENT DOCUMENTS

| | | | |
|---|---|---|---|
| 4,148,763 A | 4/1979 | Bryson | |
| 4,426,459 A | 1/1984 | Watabe et al. | |
| 4,534,799 A | * | 8/1985 | Aguirre .................. 106/270 |
| 5,303,661 A | 4/1994 | Yu et al. | |
| 5,411,215 A | 5/1995 | Rouse | |
| 5,604,277 A | 2/1997 | Osborn | |
| 5,719,215 A | 2/1998 | Liang et al. | |
| 6,040,364 A | 3/2000 | Mabry et al. | |
| 6,048,923 A | 4/2000 | Mabry et al. | |
| 6,387,966 B1 | * | 5/2002 | Goldshtein et al. ........... 521/41 |

FOREIGN PATENT DOCUMENTS

| | | |
|---|---|---|
| GB | 828162 | 2/1960 |
| WO | WO- 92/01739 | 2/1992 |
| WO | WO-00/20461 | 4/2000 |
| WO | WO-00/39206 | 7/2000 |

OTHER PUBLICATIONS

Tom Italiaander (Union Carbide), "Granular EPDM for Continuous Compounding", elastomers & polyurethanes, macplas E3 99.

* cited by examiner

*Primary Examiner*—David W. Wu
*Assistant Examiner*—Satya Sastri

(57) ABSTRACT

The present invention relates to elastomeric compositions and methods including compositions and methods involving the use of aromatic alcohols. The present invention further relates to elastomeric compositions that can include ground reclaimed elastomeric particles. Compositions of the present invention are usable in numerous elastomeric applications including interior and exterior vehicle parts, roofing, asphalt, and any other applications that employ an elastomer as an ingredient thereof, particularly those utilizing rubber or a similar elastomer.

The present invention further is directed to asphalt compositions and their methods of manufacture and use.

29 Claims, 27 Drawing Sheets

REPORT OF LABORATORY ANALYSIS OF ASPHALT BINDER

| SAMPLE LOCATION: NA | TANK # NA |
|---|---|
| DATE SAMPLED: NA | SAMPLE ID: CITGO PG 67-22 + 4% XP-378C. 09/17/01 |
| DATES TESTED: 09/29/2001-10/01/2001 | TECHNICIAN: JOHN YUIGUES |

| TEST DESCRIPTION | METHOD | SPECIFICATION | RESULTS |
|---|---|---|---|
| UNAGED ASPHALT | | | |
| SOLUBILITY | ASTM D2042 | REPORT | 99.432% |
| FLASH POINT | AASHTO T48 | 230 °C MINIMUM | 296.1 °C |
| ROTATIONAL VISCOSITY @ 135.0 °C | ASTM D4402 | 3 Pa-s MAXIMUM | 1.500 Pa-s |
| DYNAMIC SHEAR @ 76 °C | AASHTO TP5 | $G^*/\sin\delta \geq 1.0$ kPa | $G^*/\sin\delta = 1.073$ kPa |
| | | | $\delta = 82.099$ |
| SEPERATION TEST ASTM D5976 | | | |
| DYNAMIC SHEAR @ 76 °C ON TOP SECTION | AASHTO TP5 | REPORT | $G^*/\sin\delta = 1.144$ kPa |
| | | | $\delta = 81.639$ |
| DYNAMIC SHEAR @ 76 °C ON BOTTOM SECTION | AASHTO TP5 | REPORT | $G^*/\sin\delta = 1.249$ kPa |
| | | | $\delta = 80.655$ |
| DIFFERENCE | | | 4.4% |
| RTFOT AGED RESIDUE | | | |
| RTFOT | AASHTO T240 | 0.50% MAXIMUM | -0.248% |
| DYNAMIC SHEAR @ 76 °C | AASHTO TP5 | $G^*/\sin\delta \geq 2.2$ kPa | $G^*/\sin\delta = 2.639$ kPa |
| | | | $\delta = 75.144$ |
| PAV AGED RESIDUE | | | |
| DYNAMIC SHEAR @ 31 °C | AASHTO TP5 | $G^*\sin\delta < 5000$ kPa | $G^*/\sin\delta = 2321$ kPa |
| | | | $\delta = 48.616$ |
| CREEP STIFFNESS @ -12 °C | AASHTO TP1 | 300 MP MAXIMUM | 141 MPa |
| CREEP STIFFNESS @ -12 °C | AASHTO TP1 | 0.300 m-VALUE MINIMUM | 0.336 |
| THIS MATERIAL MEETS REQUIREMENTS SET FORTH IN AASHTO MP-1 AND ASTM D6373. THIS BINDER CLASSIFIES AS A PG 76-22 | | | |

FIG. 1

REPORT OF PERFORMANCE GRADE VERIFICATION OF ASPHALT BINDER

| SAMPLE LOCATION: NA | TANK # NA |
|---|---|
| DATE SAMPLED: NA | SAMPLE ID: SAMPLE PG 76-22, XP278 |
| DATES TESTED: 05/29-30/2001 | TECHNICIANS: JOHN YUIGUES AND LOUIS VALENZUELA |

| TEST DESCRIPTION | METHOD | SPECIFICATION | RESULTS |
|---|---|---|---|
| UNAGED ASPHALT | | | |
| FLASH POINT | AASHTO T48 | 230 °C MINIMUM | 269 °C |
| ROTATIONAL VISCOSITY @ 135.0 °C | ASTM D4402 | 3 Pa-s MAXIMUM | 1.260 Pa-s |
| DYNAMIC SHEAR @ 76 °C | AASHTO TP5 | $G^*/\sin\delta \geq 1.0$ kPa | $G^*/\sin\delta = 1.480$ kPa |
| | | | $\delta = 79.919$ |
| RTFOT AGED RESIDUE | | | |
| RTFOT | AASHTO T240 | 0.50% MAXIMUM | -0.263% |
| DYNAMIC SHEAR @ 76 °C | AASHTO TP5 | $G^*/\sin\delta \geq 2.2$ kPa | $G^*/\sin\delta = 3.510$ kPa |
| | | | $\delta = 71.330$ |
| PAV AGED RESIDUE | | | |
| DYNAMIC SHEAR @ 31 °C | AASHTO TP5 | $G^*\sin\delta < 5000$ kPa | $G^*/\sin\delta = 2512$ kPa |
| | | | $\delta = 47.596$ |
| DYNAMIC SHEAR @ 25 °C | AASHTO TP5 | REPORT | $G^*/\sin\delta = 4092$ kPa |
| | | | $\delta = 45.197$ |
| CREEP STIFFNESS @ -12 °C | AASHTO TP1 | 300 MP MAXIMUM | 144 MP |
| CREEP STIFFNESS @ -12 °C | AASHTO TP1 | 0.300 m-VALUE MINIMUM | 0.316 |
| THIS MATERIAL MEETS REQUIREMENTS SET FORTH IN AASHTO MP-1 AND ASTM D6373. THIS BINDER CLASSIFIES AS A PG 76-22 | | | |

*FIG. 3a*

REPORT OF SEPERATION PROPERTIES OF ASPHALT BINDER

| SAMPLE LOCATION: NA | TANK # NA |
|---|---|
| DATE SAMPLED: NA | SAMPLE ID: SAMPLE PG 76-22, XP278 |
| DATES TESTED: 05/29-30/2001 | TECHNICIAN: JOHN YUIGUES AND LOUIS VALENZUELA |

| TEST DESCRIPTION | METHOD | SPECIFICATION | RESULTS |
|---|---|---|---|
| DYNAMIC SHEAR @ 76 °C ON TOP SECTION | AASHTO TP5 | NA | $G^*/\sin\delta = 1.416$ kPa |
| | | | $\delta = 80.482$ |
| DYNAMIC SHEAR @ 76 °C ON BOTTOM SECTION | AASHTO TP5 | NA | $G^*/\sin\delta = 1.408$ kPa |
| | | | $\delta = 79.477$ |
| DIFFERENCE | | | 0.3% |
| SOFTENING POINT | ASTM D36 | NA | TOP = 59.7 °C |
| | | | BOTTOM = 60.3 °C |
| DIFFERENCE | | | 0.6 °C |

*FIG. 3b*

REPORT OF LABORATORY ANALYSIS OF ASPHALT BINDER

| SAMPLE LOCATION: NA | TANK # NA |
|---|---|
| DATE SAMPLED: NA | SAMPLE ID: CITGO PG 64-22 + 3.8% XP278 PRODUCTION |
| DATES TESTED: JULY 10 2001 TO JULY 12, 2001 | TECHNICIAN: JOHN YUIGUES AND LOUIS VALENZUELA |

| TEST DESCRIPTION | METHOD | SPECIFICATION | RESULTS |
|---|---|---|---|
| UNAGED ASPHALT | | | |
| SOLUBILITY | ASTM D2042 | REPORT | 98.458% |
| FLASH POINT | AASHTO T48 | 230 °C MINIMUM | 287 °C |
| ROTATIONAL VISCOSITY @ 135.0 °C | ASTM D4402 | 3 Pa-s MAXIMUM | 1.000 Pa-s |
| DYNAMIC SHEAR @ 76 °C | AASHTO TP5 | $G^*/\sin\delta \geq 1.0$ kPa | $G^*/\sin\delta = 0.901$ kPa |
| | | | $\delta = 84.927$ |
| RTFOT AGED RESIDUE | | | |
| RTFOT | AASHTO T240 | 0.50% MAXIMUM | -0.218% |
| DYNAMIC SHEAR @ 76 °C | AASHTO TP5 | $G^*/\sin\delta \geq 2.2$ kPa | $G^*/\sin\delta = 2.413$ kPa |
| | | | $\delta = 77.674$ |
| PAV AGED RESIDUE | | | |
| DYNAMIC SHEAR @ 31 °C | AASHTO TP5 | $G^*\sin\delta < 5000$ kPa | $G^*\sin\delta = 1841$ kPa |
| | | | $\delta = 50.331$ |
| CREEP STIFFNESS @ -12 °C | AASHTO TP1 | 300 MP MAXIMUM | 129 P |
| CREEP STIFFNESS @ -12 °C | AASHTO TP1 | 0.300 m-VALUE MINIMUM | 0.378 |

*FIG. 4*

REPORT OF LABORATORY ANALYSIS OF ASPHALT BINDER

| SAMPLE LOCATION: NA | TANK # NA |
|---|---|
| DATE SAMPLED: NA | SAMPLE ID: CITGO PG 64-22 + 3.8% 278 CONTROL |
| DATES TESTED: JULY 6, 2001 TO JULY 10, 2001 | TECHNICIAN: LOUIS VALENZUELA |

| TEST DESCRIPTION | METHOD | SPECIFICATION | RESULTS |
|---|---|---|---|
| UNAGED ASPHALT | | | |
| SOLUBILITY | ASTM D2042 | REPORT | 99.712% |
| FLASH POINT | AASHTO T48 | 230 °C MINIMUM | 278 °C |
| ROTATIONAL VISCOSITY @ 135.0 °C | ASTM D4402 | 3 Pa-s MAXIMUM | 1.140 Pa-s |
| DYNAMIC SHEAR @ 76 °C | AASHTO TP5 | $G^*/\sin\delta \geq 1.0$ kPa | $G^*/\sin\delta = 1.321$ kPa |
| | | | $\delta = 80.827$ |
| RTFOT AGED RESIDUE | | | |
| RTFOT | AASHTO T240 | 0.50% MAXIMUM | -0.283% |
| DYNAMIC SHEAR @ 76 °C | AASHTO TP5 | $G^*/\sin\delta \geq 2.2$ kPa | $G^*/\sin\delta = 3.030$ kPa |
| | | | $\delta = 74.683$ |
| PAV AGED RESIDUE | | | |
| DYNAMIC SHEAR @ 31 °C | AASHTO TP5 | $G^*\sin\delta < 5000$ kPa | $G^*/\sin\delta = 1180$ |
| | | | $\delta = 50.737$ |
| CREEP STIFFNESS @ -12 °C | AASHTO TP1 | 300 MP MAXIMUM | 124 P |
| CREEP STIFFNESS @ -12 °C | AASHTO TP1 | 0.300 m-VALUE MINIMUM | 0.358 |
| THIS MATERIAL MEETS REQUIREMENTS SET FORTH IN AASHTO MP-1 AND ASTM D6373. THIS BINDER CLASSIFIES AS A PG 76-22 | | | |

*FIG. 5*

| ASPHALT GRADE: | PG 82-22 | SUBMITTED BY: | ROUSE POLYMERICS |
|---|---|---|---|
| DATE SAMPLED: | 8/15/01 | ADDRESS: | 4% XP 378A PROCESS B |
| TANK SAMPLED: | VICKSBURG PRODUCED | | IN SAVANNAH PG 67-22 |
| DATE TESTED: | 8/16/01 | | |

| TEST | METHOD | SPECIFICATIONS | TEST RESULTS | |
|---|---|---|---|---|
| UNAGED ASPHALT | | | | |
| FLASH POINT, °C | AASHTO T48 | > 230°C | 282 | |
| VISCOSITY (BROOKFIELD) @ 135°C, Pa-s | ASTM D4402 | < 3 Pa-s | 1.842 | |
| VISCOSITY (BROOKFIELD) @ 165°C, Pa-s | ASTM D4402 | REPORT | 0.43 | |
| DYNAMIC SHEAR, 10 RAD/SEC | AASHTO TP5 | > 1.00 kPa | | |
| G*/SIN δ AND δ @ T °C, kPa | | 76°C | 2.246 | 74.8 |
| | | 82°C | 1.246 | 77.5 |
| RTFO AGED RESIDUE | AASHTO T240 | | | |
| MASS CHANGE, % | AASHTO T240 | < 0.50 wt % | -0.263 | |
| DYNAMIC SHEAR, 10 RAD/SEC | AASHTO TP5 | > 2.20 kPa | | |
| G*/SIN δ @ T °C, kPa | | 76°C | 4.826 | |
| | | 82°C | 2.570 | |
| PAV AGED RESIDUE @ 100°C | AASHTO PP1 | | | |
| DYNAMIC SHEAR, 10 RAD/SEC | AASHTO TP5 | < 5000 kPa | | |
| G*/SIN δ @ T °C, kPa | | 25°C | 3727 | |
| CREEP STIFFNESS AND M-VALUE, 60 SEC | AASHTO TP1 | < 300 MPa  > 0.300 | s | m |
| @ T °C | | -12°C | 127 | 0.334 |
| THIS BINDER CLASSIFIES AS A | | | PG 82-22 | |

SEPARATION BY DSR:    TOP    2.046    75.3
BOTTOM    2.476    73.1
% SEPARATION    9.5

FIG. 6

SILVER EAGLE REFINING WOODS CROSS INC.
RESEARCH AND DEVELOPMENT RESULTS

| GRADE: | (TRM)PG70-28 | DATE: | | 8/2/01 | ID NUMBER: | 4 |
|---|---|---|---|---|---|---|
| LAB/TECH: | | | | | REFERENCE: | ASAP |
| APPEARANCE: | | | | | | |

| PROPERTY: | TEST | SPEC | TEMP | | | |
|---|---|---|---|---|---|---|
| ORIGINAL BINDER | | | | | | |
| DYNAMIC SHEAR G*/SIN5 | TP6 | 1.00 kPa min | 70°C | 1.53 | | |
| PHASE ANGLE & DEGREES | TP6 | REPORT | 70°C | 73.5 | | |
| DYNAMIC SHEAR G*/SIN5 | TP6 | 1.00 kPa min | 76°C | | | |
| PHASE ANGLE & DEGREES | TP6 | REPORT | 76°C | | | |
| DYNAMIC SHEAR G*/SIN5 | TP6 | 1.00 kPa min | C | | | |
| PHASE ANGLE & DEGREES | TP6 | REPORT | C | | | |
| SIEYE TEST #10 NAVADA | T730 | PASS | | 0.450 | | |
| VISCOSITY BREAK FIELD | D4402 | 0.0 Pas max | 135°C | 1.40 | | |
| ABSOLUTE VISCOSITY Pas | T-202 | | 60°C | | | |
| VISCOSITY Pas | T-201 | | 135°C | | | |
| PRODUCTION 100g dmm | T-49 | | 25°C | | | |
| FLEA\PAINT C.O.C.C | T49 | 230°C min | | 240+ | | |
| TOUGHTMASS, 25C 50 cm/min | D5801 | N m, m-lbs | 25°C | 12 | 136 | 12.43 min NV |
| TANACITY, 35C cm/min | D5801 | N m, m-lbs | 25°C | 8.8 | 76 | 5.47 min NV |
| SPECIFIC GRAVITY | D70 | REPORT | 25°C / 158°C | 1.005 | | |
| DUCTILITY, 5 cm/min | D113 | REPORT | 4°C | | | 120 min NV |
| RTF() RESIDUE: | | T240 | | | | |
| DYNAMIC SHEAR G*/SIN5 | TP6 | 2.20 kPa min | 70°C | 2.96 | | |
| PHASE ANGLE & DEGREES | TP6 | REPORT | 70°C | 65.2 | | |
| DYNAMIC SHEAR G*/SIN5 | TP6 | 2.20 kPa min | 76°C | | | |
| PHASE ANGLE & DEGREES | TP6 | REPORT | 76°C | | | |
| DYNAMIC SHEAR G*/SIN5 | TP6 | 2.20 kPa min | C | | | |
| PHASE ANGLE & DEGREES | TP6 | REPORT | C | | | |
| ABSOLUTE VISCOSITY Pas | T-202 | | 50°C | | | |
| MASS CHANGE % | T240 | 0.50% max | 153°C | 0.298 | | |
| ELESTIC RECOVERY, % RECOVERY | T301 | | 25°C | | | |
| DUCTILITY, 5 cm/min | D113 | 25min | 4°C | | | 10 min NV |

FIG. 7a

SILVER EAGLE REFINING WOODS CROSS INC.
RESEARCH AND DEVELOPMENT RESULTS

| GRADE: | (TRM)PG70-28 | DATE: | 8/2/01 | ID NUMBER: | 4 |
|---|---|---|---|---|---|
| LAB/TECH: | | | | REFERENCE: | ASAP |
| APPEARANCE: | | | | | |

| PROPERTY: | TEST | SPEC | TEMP | | | |
|---|---|---|---|---|---|---|
| PAV RESIDEUE: | | | | | | |
| DYNAMIC SHEAR G*/SIN5 | TP6 | 5000 kPa max | C | 1.288 | | |
| PHASE ANGLE & DEGREES | TP6 | REPORT | C | | | |
| DYNAMIC SHEAR G*/SIN5 | TP6 | 5000 kPa max | C | | | |
| PHASE ANGLE & DEGREES | TP6 | REPORT | C | | | |
| DYNAMIC SHEAR G*/SIN5 | TP6 | 5000 kPa max | C | | | |
| PHASE ANGLE & DEGREES | TP6 | REPORT | C | | | |
| CREAP SNIFFNESS, MPa | TP1 | 500 MPa max | -16°C | 1.517 | | |
| M VALUE | TP1 | 0.300 min | -18°C | 0.318 | | |
| CREAP SNIFFNESS, MPa | TP1 | 300 MPa max | C | | | |
| M VALUE | TP1 | 0.300 min | C | | | |
| CREAP SNIFFNESS, MPa | TP1 | 300 MPa max | C | | | |
| M VALUE | TP1 | 0.300 min | C | | | |
| DIRECT TENSION FAILURE STRAIN | TP3 | 1.396 min | -16°C | 2.77 | | |
| STRESS TENSION FAILURE MPa | TP3 | REPORT | -18°C | 2.98 | | |
| DIRECT TENSION FAILURE STRAIN | TP3 | 1.396 min | C | | | |
| STRESS TENSION FAILURE MPa | TP3 | REPORT | C | | | |
| DIRECT TENSION FAILURE STRAIN | TP3 | 1.396 min | C | | | |
| STRESS TENSION FAILURE MPa | TP3 | REPORT | C | | | |

| NOTES UNIT COMMENTS: | INGREDIENTS | PERCENT | PERCENT | PARTS |
|---|---|---|---|---|
| | FRONTIER 58-25 | 95.00000% | 95.00000% | 665.00000 |
| THIS PRODUCT CONTIANS A MINIMUM OF 3% GROUND TIRE RUBBER | SHELL 1184 | 0.00000% | 0.00000% | 0.00000 |
| | ENICHEM 1618 | 0.00000% | 0.00000% | 0.00000 |
| | EXTENDET | 0.00000% | 0.00000% | 0.00000 |
| | SULFUR | 0.00000% | 0.00000% | 0.00000 |
| | XP-277 | 5.00000% | 5.00000% | 35.00000 |
| | | 0.00000% | 0.00000% | 0.00000 |
| USED TK #6 FOR EXTENDER / LOW SITEER | TOTALS | 100.00000% | 100.00000% | 700.00000 |

*FIG. 7b*

INITIAL EVALUATION OF
PROCESS B
BOTH MIXING AND SHEARING @ 190°C

| MODIFIER CHART | 8% | 4% | 35 | 35 |
|---|---|---|---|---|
| INTERACTION TIME | 8Hs | 20Hs | 8Hs | 20Hs |
| SEPARATION520% | 150% | 210% | 420% | |
| G*Sinδ @ 76°C, kPa | 219 | 372 | 131 | 158 |
| PHASE ANGLE,δ, DEG | 736 | 721 | 838 | 787 |
| VISCOCITY@135°C, PAS | 171 | 241 | 128 | 147 |

*FIG. 18*

TESTING ON XP-378 BINDER
4% MODIFIER, TOTAL OF 8 HRS INTERACTION @ 190°C

| | PAV AGED |
|---|---|
| G*/Sin DELTA @ 76°C, kPa | 1.097 |
| DELTA @76°C DEG. | 83.6 |
| G*/Sin DELTA@76°C, kPa | 2687 |
| G*/Sin DELTA@25°C, (kPa) | 3114 |
| S(MPA), M-VALUE @ 12°C | 136, 0.349 |
| SEPARATION TEST, DSR | 10% |
| SEPARATION TEST, SP, °C | 1.1 |

UN-AGED     RTFOT AGED     PAV AGED

*FIG. 19*

TESTING ON XP-379 BINDER
6% MODIFIER, TOTAL OF 6 HRS INTERACTION @ 193°C

| | |
|---|---|
| G*/Sin DELTA @ 76°C, kPa | 1.693 |
| DELTA @76°C, DEG. | 77.9 |
| G*/Sin DELTA@76°C, kPa | 3.456 |
| G*Sin DELTA@25°C (kPa) | 3816 |
| S(MPA), M-VALUE @ 12°C | 147, 0.331 |
| SEPARATION TEST, DSR | 18% |
| SEPARATION TEST, SP, °C | 2.2 |

UN-AGED        RTFOT AGED        PAV AGED

*FIG. 20*

PROCESS COMPARISON
3.8% MODIFIER, MIXING ONLY @ 190°C FOR 12 HRS

| | PROCESS A | PROCESS B |
|---|---|---|
| G*/Sin DELTA @ 76°C, kPa | 0.901 | 1.269 |
| DELTA @76°C DEG. | 84.92 | |
| G*/Sin DELTA@76°C, kPa | 2.413 | |
| G*/Sin DELTA@61°C, kPa | 1841 | 1750 |
| S @ -12°C, Mpa | 122 | |
| M @ -12°C | 0.37 | 0.369 |

UN-AGED     RTFOT AGED     PAV AGED

*FIG. 22*

ELASTOMER RECLAIMING COMPOSITION AND METHOD

CROSS-REFERENCE TO RELATED APPLICATIONS

The following application claims priority to U.S. Provisional Application Ser. No. 60/331,537, filed Nov. 19, 2001, entitled "Use of Wet Grinding for Compounding Resinous Materials",U.S. Provisional Application Ser. No. 60/331, 538, filed Nov. 19, 2001, entitled "Elastomer Reclaiming Composition and Method", and U.S. Provisional Application Ser. No. 60/334,097, filed Nov. 30, 2001, entitled "Resinous Materials and Methods for Their Production and Use", the entire disclosures are incorporated herein by reference.

BACKGROUND OF THE INVENTION

1. Field of the Invention

The present invention relates to reclaiming of elastomers. More particularly, the present invention relates to compositions containing elastomeric particles and methods for producing the compositions.

2. Description of Related Art

Various types of elastomeric materials (e.g., natural rubber, synthetic rubber, recycled rubbers containing polyethylene and/or polypropylene, vulcanized rubber, carbon black, waste from tire production, various polymers, various plastics, thermoplastic elastomers, thermoplastic vulcanates and polyethylene plastics) can be recycled or reclaimed, and used to make other products. For example, synthetic rubber obtained form used vehicle tires can be used in a process to make asphalt. In recycling and reusing such elastomeric materials, it is often necessary to reduce the particle size of the elastomeric materials. The relatively small particles are typically more susceptible to chemical modification, and mechanically easier to blend with other components.

One method for producing elastomeric materials with a reduced particle size include milling the elastomer between horizontal grinding stones in a horizontal grinding mill. Similar milling techniques have been developed and used in the flour, paper pulp industry and the paint pigment-compounding industries. A horizontal grinding mill includes opposite milling wheels with a fixed wheel (stone) and the other wheel rotates relative to the fixed wheel. To grind elastomeric materials a composition containing the elastomer is directed to an area between the two stones, and is ground to a fine state. However, such known milling methods have the disadvantage of creating friction, which can increase the temperature of the composition. Increased composition temperatures can cause "flash over" in which the composition becomes a largely dry elastomeric mass that inhibits further grinding. In the case of rubber, e.g., synthetic rubber, these milling methods often do not produce a uniformly fine rubber powder that passes through a minus 50-mesh.

Accordingly, there is an interest to improve upon current methods for making elastomeric materials of a relatively small particle size. The advantages sought include decreasing the amount of soak time, or decreasing the time it takes to bring the elastomer to the desired particle size. There is also interest to convert an elastomer to a decreased particle size at relatively low process temperatures to minimize flash over. There is also interest for elastomeric compositions that are more susceptible to chemical modification such that their physical properties can also be modified. The present invention addresses one or more of these desired process parameters in making novel elastomeric compositions for later use in other products.

Reclaimed elastomeric materials are often used in downstream products such as construction materials, e.g., asphalt and roofing products. In asphalt production, reclaimed or recycled rubber is added to the asphalt mixture in stages and at a different temperatures than virgin rubbers and unvulcanized materials. As a result, if an asphalt manufacturer desires to add block rubber such as SBS, virgin rubber or wide spec rubber, into the asphalt as well as a recycled rubber, the block material is generally added in a first asphalt tank at a temperature of about 380° F. The coursely ground reclaimed material is typically added in a separate asphalt tank at a higher temperature of about 410° F. This methodology is cumbersome and requires may process steps and temperature controls. To avoid the need of having to purchase and maintain additional process equipment many asphalt produces tend not to include recycled materials.

SUMMARY OF THE INVENTION

The invention is directed to a method of making a slurry with reclaimed elastomer, the method comprising providing a milling composition, wherein the milling composition comprises an elastomer, a wetting agent, and a devulcanizing effective amount of an aromatic alcohol, and grinding the milling composition. The aromatic alcohol is selected from the group consisting of phenol and creosol. The aromatic alcohol can be drived from anise seed or birch bark, which is ground with the elastomer.

The invention is also directed to a composition comprising: ground reclaimed elastomeric particles; a wetting agent; and a devulcanizing effective amount of an aromatic alcohol selected from the group consisting of phenol and creosol, The aromatic alcohol can be drived from anise seed or birch bark, which is ground with the elastomer. The wetting agent is preferably pyrrolidone or a pyrrolidone derivative.

The invention is also directed to an asphalt composition comprising elastomeric particles that were reduced in particle size in the presence of a wetting agent and a devulcanizing amount of an aromatic alcohol selected from the group consisting of phenol and creosol. The asphalt composition can also contain a fibrous material selected from ground anise seeds, ground birch bark, or a mixture thereof.

BRIEF DESCRIPTION OF THE DRAWINGS

FIG. 1 is a report of an analysis of an asphalt binder according to one embodiment of the present invention.

FIGS. 3a and 3b are reports of analyses of asphalt binders according to one embodiment of the present invention.

FIGS. 4–7 are reports of analyses of asphalt binders performance under certain conditions according to an embodiment of the present invention.

FIGS. 18–20 are summary graphs of results obtain for compositions of the present invention.

FIG. 22 is a chart comparing process A and process B in terms of various properties.

DETAILED DESCRIPTION OF A PREFERRED EMBODIMENT

Figure 2:
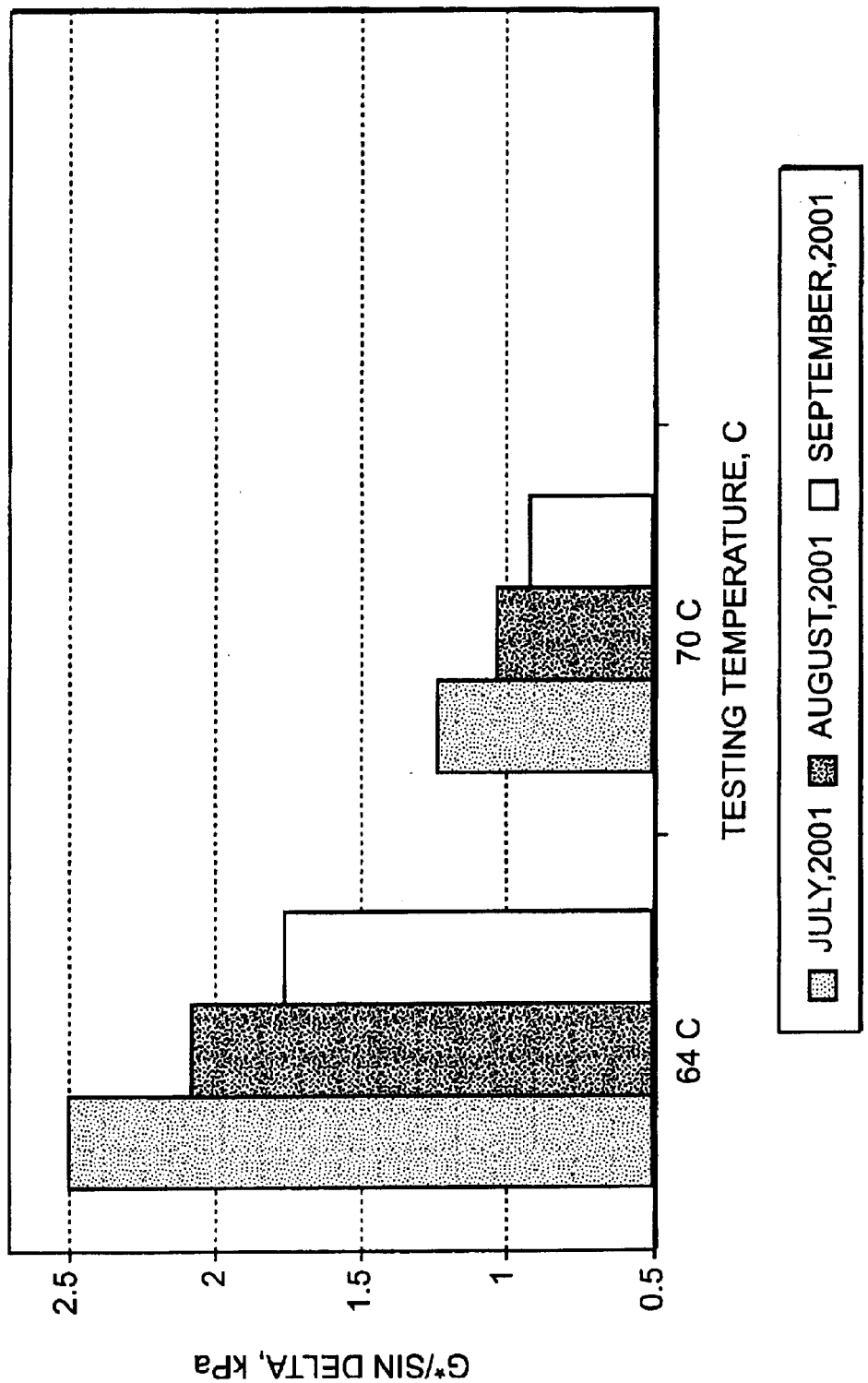
FIG. 2 is a graph showing G*/sin delta kPa verses testing temperature for tests run on an asphalt prepared according to the present invention.
Figure 8:
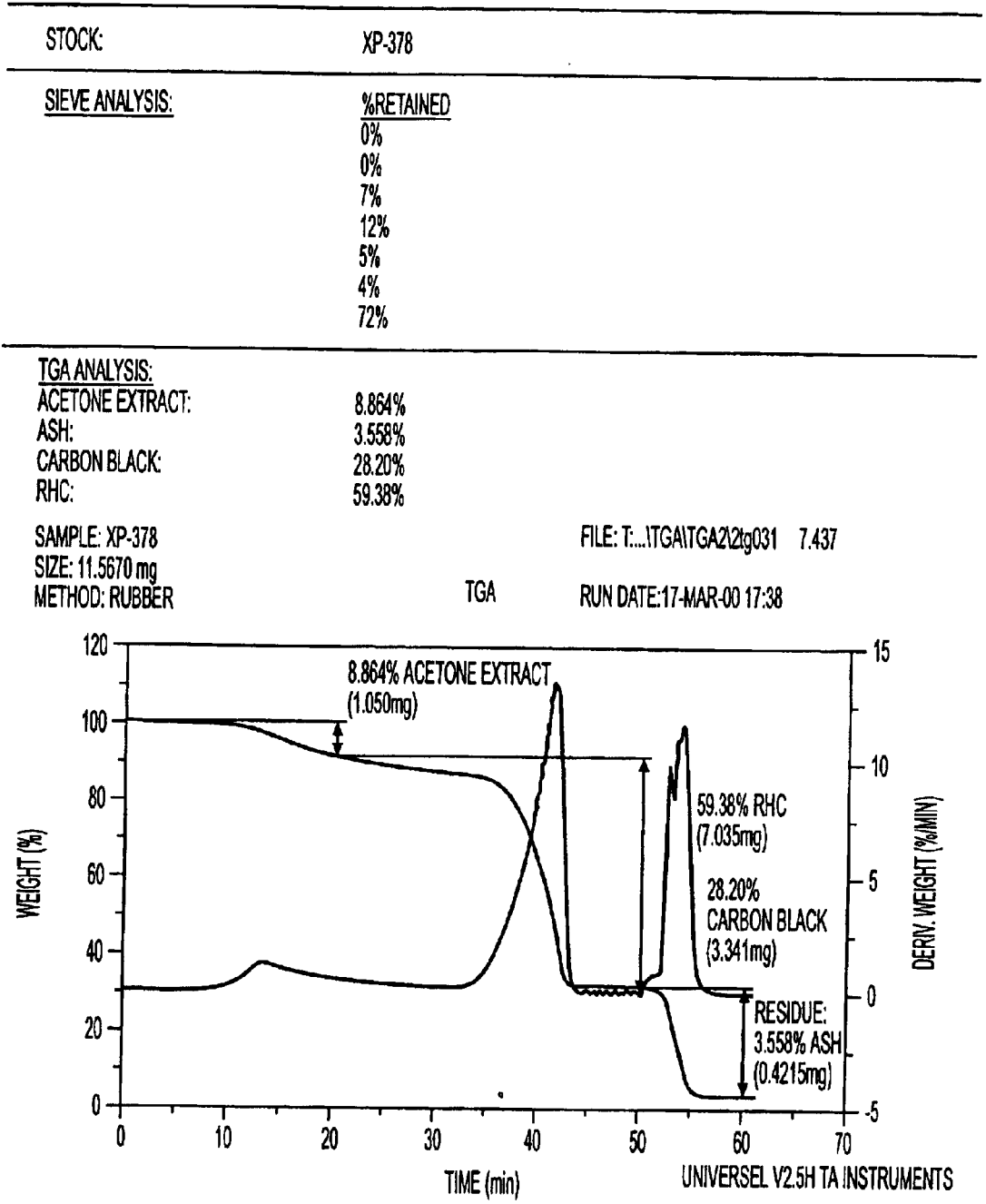
FIGS. 8–14 are graphs showing weight vs. time of various asphalt compositions according to the present invention.
Figure 9:
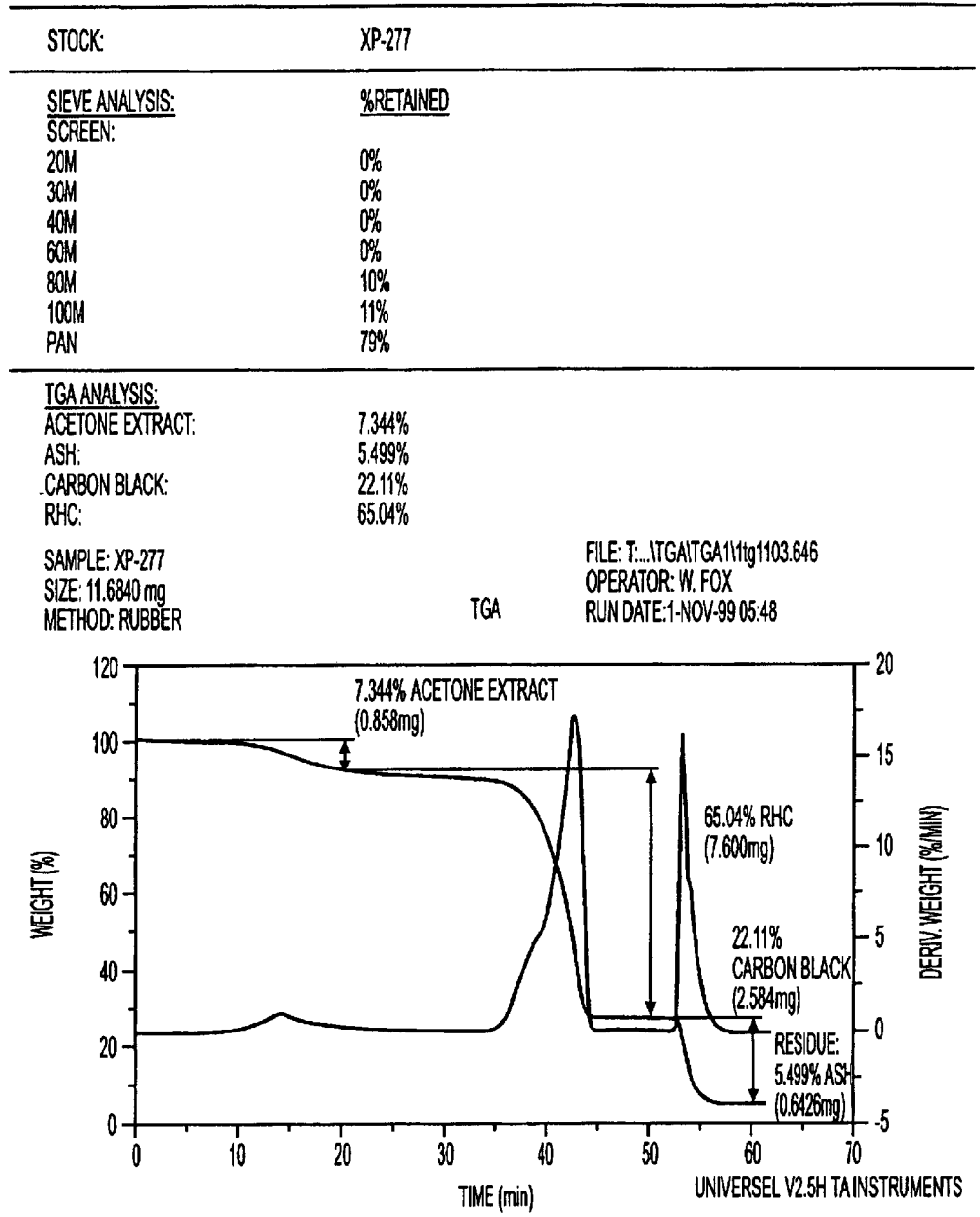
Figure 10:
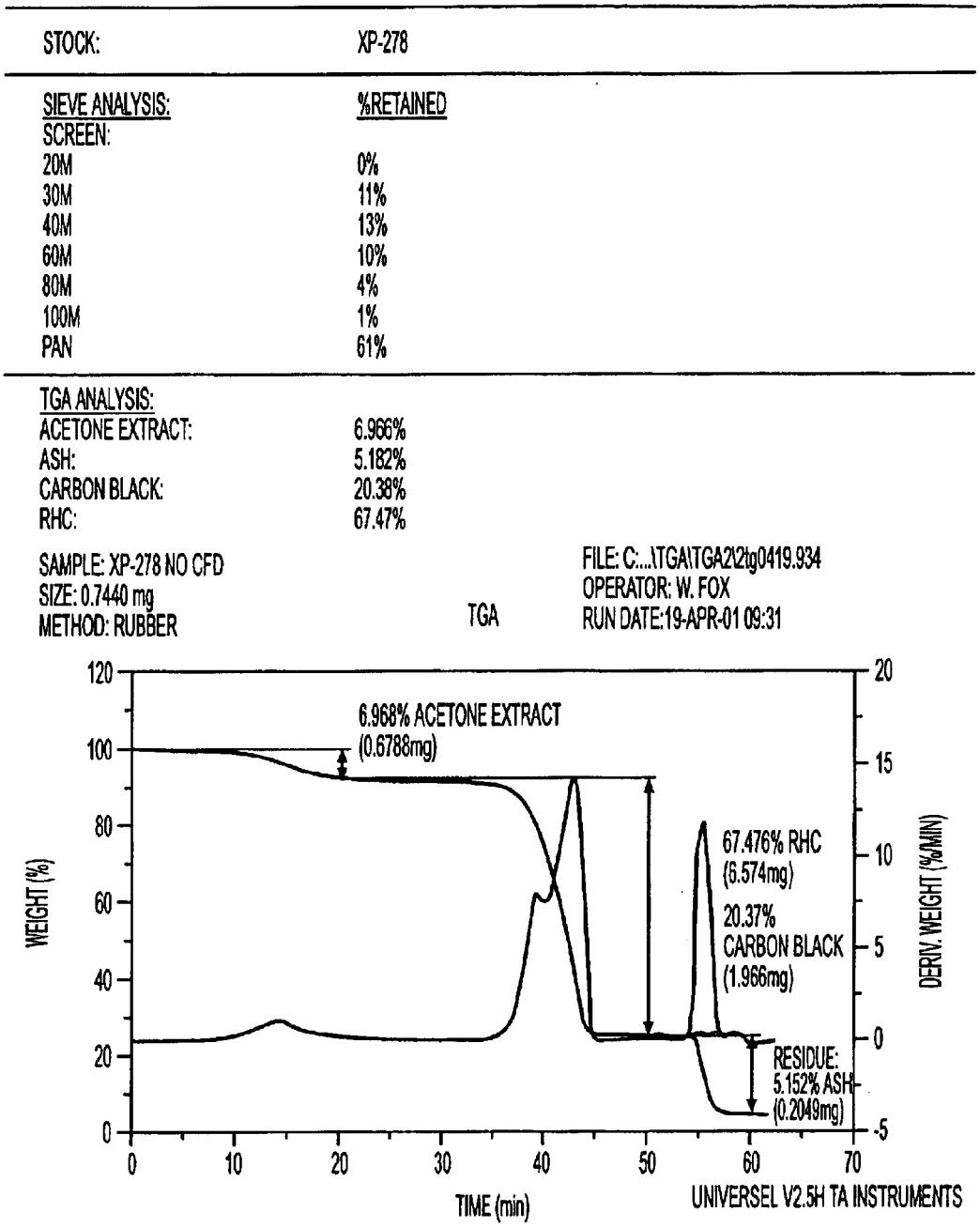
Figure 11:
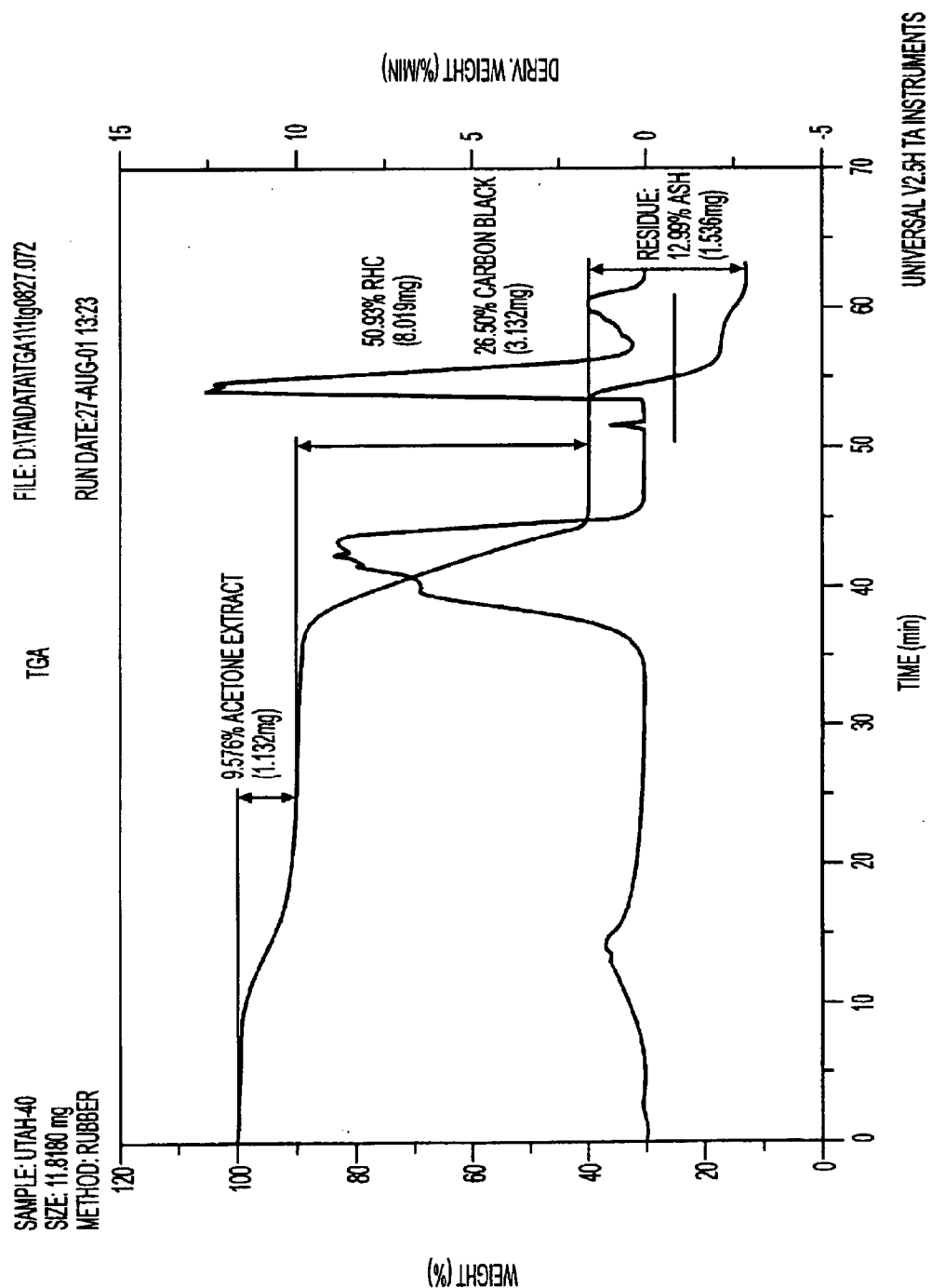
Figure 12:
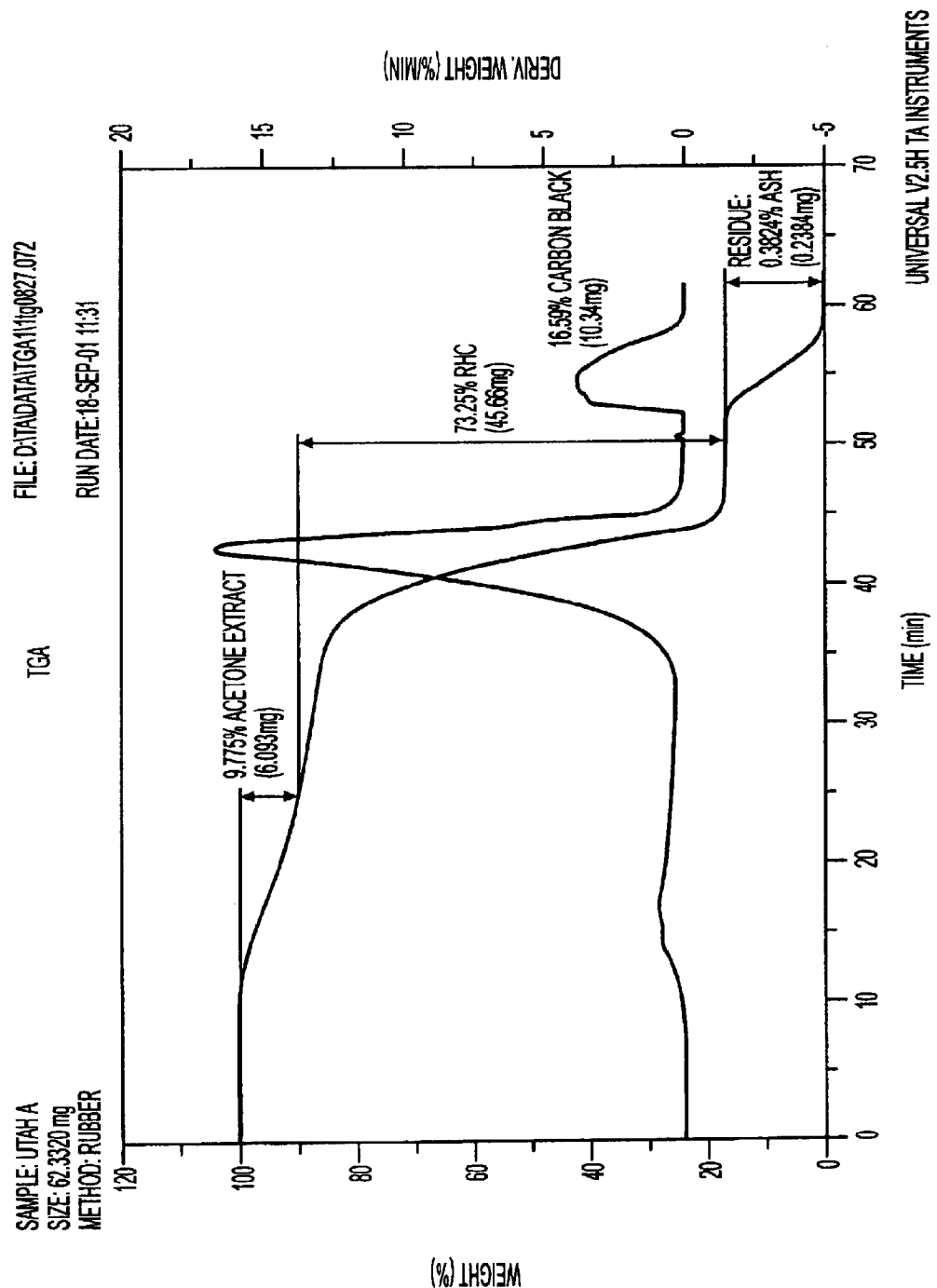
Figure 13:
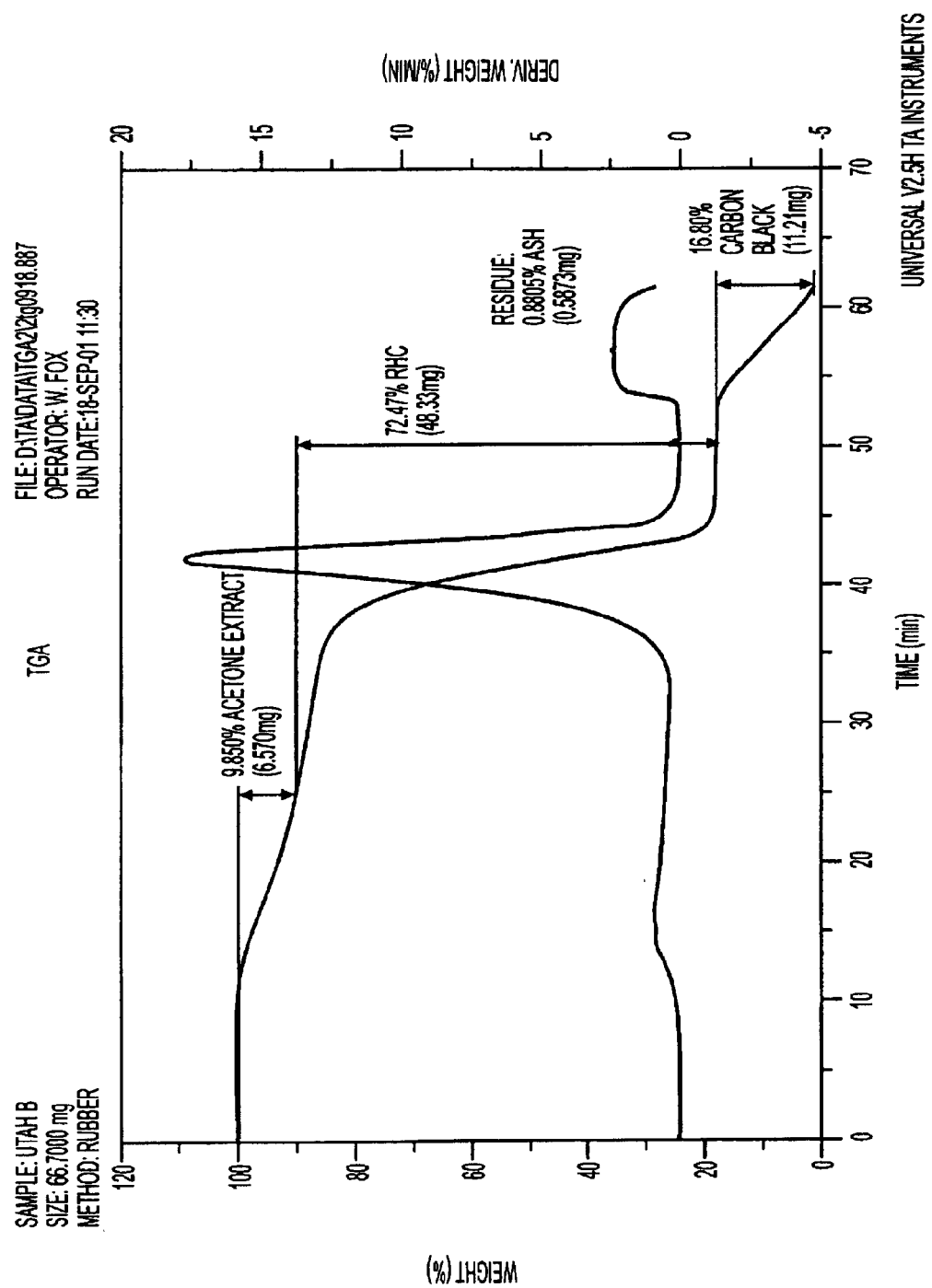
Figure 14:
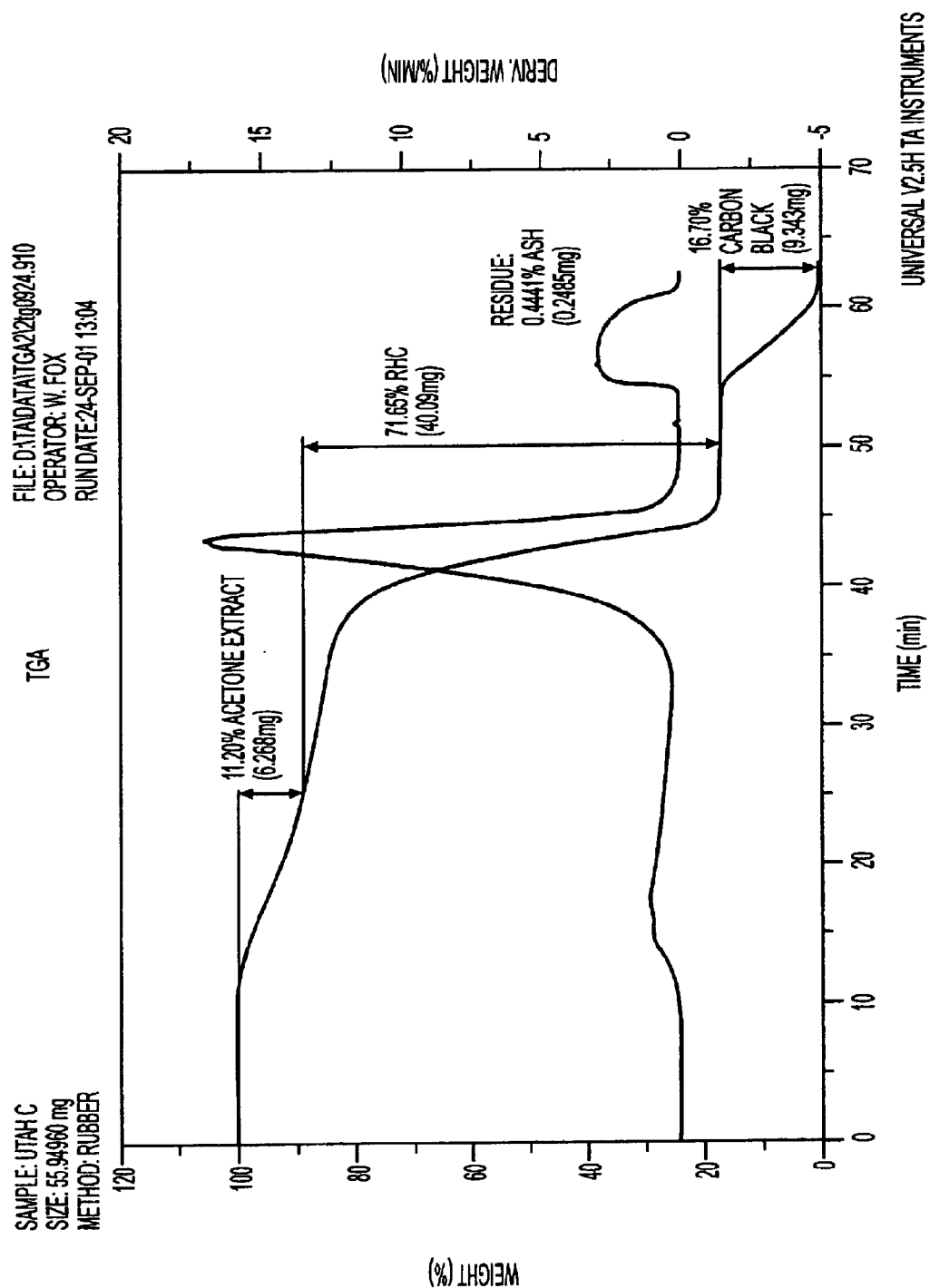

The invention is directed to a method of reclaiming elastomers, by reduction of their particle size and to compositions containing the elastomers of reduced particle size. The method of the invention includes making a product slurry with reclaimed elastomer, the method comprising: providing a milling composition, wherein the milling composition comprises an elastomer, a wetting agent, and a devulcanizing effective amount of an aromatic alcohol; and grinding the milling composition.

Aromatic alcohols are particularly effective additive in devulcanizing the elastomer. The addition of an aromatic alcohol provides a more favorable particle for devulcanization. In a preferred embodiment, the aromatic alcohol is selected from creosol or phenol. The amount of aromatic alcohol added to the elastomer should be sufficient to substantially devulcanize the elastomer and disrupt the available C—$S_n$—C (n≦1) bonds.

A preferred aromatic alcohol is creosol. Creosol can be added directly to the elastomer. One source of creosol is derived as an oil extract from the seeds of *Pimpinella anisum* (anise) or the bark of birch trees. As a result, the process of the invention can include milling anise seeds or birch bark with the elastomer. As the seed or bark is milled, the creosol is extracted and contacts the elastomer. The fibrous remains of the anise seed or birch bark can be left in the composition as a filler.

Additives can also be present in the elastomeric compositions of the invention. The additives in combination with creosol provides a more efficient grinding of the elastomeric composition in one embodiment, DAXAD®, commercially available form R.T. Vanderbilt Company, Inc. of Norwalk, Conn., can be used as an additive. DAXAD® is a water miscible dispersing agent for carbon black. Typically, the elastomeric composition contains from about 1–10% DAXAD® based on the weight of solids in the slurry. In another embodiment, a surfactant, e.g., TRITON-X®, commercially available from Rohm & Haas Company can be used as an additive. Typically, the elastomeric composition contains from about 1% to 20%, or from about 1% to 15%, based on the amount of solids in the slurry. The elastomeric particles milled in the presence of an additive provide particles with properties, e.g., size and uniformity, as compared to particles produced from a milling elastomeric composition in which an additive is not present In another embodiment, the additive is a natural or synthetic resin, or a resin acid. A resin acid are abietic-type acids that contain an isopropyl group attached to carbon 13 as numbered using the Chemical Abstracts system. Resin acids known as pimaric-type acids that include a methyl and vinyl group attached to carbon 13 can also be used. Of course, it is understood that any combination of any two or more resin acids can be used In another embodiment, the additive is a or rosin (a mixture of monocarboxylic acids having a hydrophenanthrene nucleus) such as gum rosin or wood rosin. Rosins are of particular interest because they tend to act as dispersing agents in the milling composition. The rosins can also have a desirable affect on the tackiness of the elastomeric composition of the invention. Preferably, the rosin is a tall oil rosin, which is a by-product of the paper manufacturing. Use of a tall oil rosin with a low acid number is particularly preferred. Actinal R type S, available from Arizona Chemical Co., is one such tall oil rosin with low acid number.

In another embodiment, the additive is a rosin soap. Rosin soap is prepared by treating a rosin with a base such as sodium hydroxide, ammonia, ammonium hydroxide, or an amine such as a Frisch amine. In this way, the solubility of the rosin in water is enhanced. Other additives of inter include any rosin acid, polymerized rosin acid, esters of rosin acid, dispersions of rosin acid, dispersions of esters of rosin acid, copolymers of rosin acids, disproportionated rosin acids, and hydrogenated rosin acids. Particular rosin acids that can be used include 9-anthracene carboxylic acid, 2-ethylhexanoic acid.

In another embodiment, the additive is a fatty acid such as oleic acid.

In another embodiment, the additive is an oligomer or copolymers of styrene and maleic anhydride. Preferably, the oligimer has a viscosity of about 100,000 cps and tends to act as a dispersing agent in the milling composition. One oligomeric resin that can be used is SMA™ resin, available from Sinclair Petrochemicals, Inc. One copolymer resin that can be used is ethylene-maleic anhydride copolymer such as EMA™ resin, available from Monsanto Industrial Chemicals Co.

In another embodiment, the additive is an ester. The ester can be selected, for example, from di(2-ethylhexyl) adipate (DOA), (DOS), (DOD), as well as other suitable esters.

The additive can be added in any desired amount. Preferably the additive is added in an amount from 0.5% to 95%, more preferably from 5% to 40% advantageously from 5% to 20% but in a preferred embodiment is added in an amount of about 10% or 10%, in each case being based on the total weight of the elastomer.

A filler can also be added to the milling composition to provide additional reinforcing properties, temperature-modifying properties, increased high surface area, and/or increased tensile strength to the elastomeric compositions of the invention. On filler that can be used is nylon and the many nylon derivatives.

Wetting agents can also be added to the elastomer to enhance the water solubility of the aromatic alcohols. The wetting agents are believed to facilitate the permeation of the aromatic alcohol into the elastomer. In practice any wetting agent can be used which enhances. dispersibility of the aromatic alcohol in the typically acqueous milling compositions. Exemplary wetting agents that can be used include pyrrolidone or pyrrolidone derivatives such as N-alkyl derivatives. N-methyl-2pyrolidone (NMP) is a preferred wetting agent because it is a water soluble, biodegradable solvent. Also, NMP in combination with creosol forms a synergistic solvent mixture that facilitates breakage of C—$S_n$—C (n≧1) bonds and imparts thermoplasticity to recycled vulcanized materials in the milling process.

In one embodiment, the elastomer is soaked/or treated in the presence of a wetting agent and one or more aromatic alcohols selected from phenol or creosol. In the case of creosol, a portion, or all, of the creosol can come from anise seed and/or birch bark The amount of the wetting agent may vary depending on the type of wetting agent and amount of creosol. The amount of wetting agent used is well within the skill of the artisan. In general however, the wetting agent is present in an amount of about 1% to about 10%, preferably about 1% to about 3%, based on the total weight of the milling composition. A mining composition comprises composition containing an elastomeric material and one or more additives. The milling compositions include those compositions in the process of the invention that are directed to the milling apparatus or other grinding apparatus, or to the compositions in the milling or grinding apparatus.

The process of the invention can include treating the elastomeric material with one or more soaking fluids prior to milling. The soaking of elastomer is described in Applicants' co-pending application Ser. No. 09/247,569 entitled "GROUND ELASTOMER AND METHOD" filed Feb. 10, 1999, the entire disclosure of which is incorporated herein by reference.

Preferred scalding fluids that are used are selected from soapy water or an aromatic oil. Soaking the elastomer, among other things, causes the elastomer to swell, removes oils from the elastomer and dissolves adhesives in the elastomer. According to an exemplary embodiment, a variety of water-soluble additives may be added to the soaking fluid. The additive, when used during soaking of the elastomer, decreases the swelling time of the elastomer as compared to elastomers soaked in the absence of the additive. The soaking fluid can also be a chemical that swell the elastomer. Chemicals that can be used include tetrahydrofuran (THF), dimethyl formamide (DMF), and a a fatty amine, such as d-limonene or DELAMIN®, commercially available from Hercules, Inc.

In another embodiment, a carrier fluid can be added to a milling composition. The carrier fluid can be a gas, e.g., air, or a liquid, e.g., water. The carrier fluid is used to facilitate transfer of a milling composition to and/or from the grinding apparatus. A carrier fluid can also be added directly to the grinding apparatus or to the milling composition prior to milling. If the carrier fluid is added directly to the grinding apparatus a uniform set point fluid flow rate through a properly spaced set of milling stones is determined as described in U.S. Pat. No. 5,238,194 issued Aug. 24, 1993 to Rouse et al., entitled "METHOD OF PRODUCING FINE ELASTOMERIC PARTICLES", the entire disclosure of which is incorporated herein by reference.

The process of the invention and the resulting milling compositions produced by the process increase overall process efficiency by minimizing the need for subsequent grinding steps. Also, the process and compositions of the invention provide relatively short grinding times to reach a desirable particle size and reduce wear and damage to the grinding apparatus.

The additives provide a lower temperature to the slurry as compared to a slurry in which the additive is absent. A slurry in which the additive is absent reaches a temperature of about 400° to 450° Fahrenheit, whereas the slurry having the additive reaches a temperature of about 300° degrees Fahrenheit. Decreased temperature of the slurry is beneficial, in part, because high temperatures may destroy some polymers, less insulation is required in the grinding apparatus, heat damage to the grinding apparatus is decreased and the temperature of the grinding operation is better controlled to achieve the desired viscoelastic effects in milling the elastomer.

The additives chemically react with the elastomer to produce a more desirable elastomer particle. The glass transition temperature (Tg) of the elastomer-additive product is reduced as compared to elastomer particle product in which the additive is absent. A lower Tg value is beneficial in producing downstream materials from the elastomer-additive product because a lower temperature is required for the elastomer additive product to change from a brittle state to a plastic state, which reduces energy costs.

Further, the additives chemically react with the elastomer to produce a more tacky elastomer-additive particle product. Further, the additives chemically interact with the elastomer to produce a tackier elastomer-additive particle product as compared to the elastomer particle product in which the additive is absent. The final product can be slabbed or baled to eliminate packaging costs for the powders. This is highly beneficial for compounding of materials that employ an elastomer and an additive as defined herein as one component of the compound. That is, the baled or slabbed product can be easily shipped without the need for a separate bag to contain the powder and the bale or slab can be tailored to exact specifications of the downstream compounder's needs. Each bale or slab can include the exact amount of elastomer and additive needed for a single batch or mixture in the compounding operation.

Reducing the particle size of the elastomer can be accomplished using methods known to those skilled in the art. One method includes the use of milling stones, as described above. Another method includes freezing the elastomer, followed by cracking or hammering the elastomer into small sized particles. In another method, elastomer is shredded by a series of blades or in an Archimedes screw apparatus.

Milling of the elastomer material can be carried out by using the grinding apparatus described in U.S. Pat. No. 5,238,194 to Rouse et al., titled "METHOD OF PRODUCING FINE ELASTOMERIC PARTICLES", the entire disclosure of which is incorporated herein by reference. The horizontal grinding apparatus includes a fixed stator and a rotating rotor, on which disc-shaped grinding stones typically having hollow centers can be mounted. The grinding stones provide flat, opposing abrasive surface i.e., flat annulus surface. The abrasive surfaces provide periodically spaced openings in the annulus for introducing the elastomer to be milled between the closed, cooperating abrading surfaces.

Alternatively, milling of the elastomer material can be carried out by a combination milling method. The combination miller method include: providing a filler material and a dispersant or surfactant in a first mill to form a ground filler material; combining said ground filler material with an elastomer to form an intermediate slurry comprising said ground filler material and said elastomer, grinding said intermediate slurry in a second grinding mill to produce an elastomer masterbatch; and recovering said elastomer masterbatch.

In a preferred embodiment, the grinding option may be conducted in a multiple pass where two interconnected grinding mills sequentially grind the slurry to a final fine grind state as disclosed in U.S. Pat. No. 5,411,215 issued May 2, 1995 to Rouse for "TWO STAGE GRINDING" and incorporated herein by reference. According to the multiple pass grinding operation, a first grinding mill produces an intermediate feedstock of deceased size. The feedstock is re-wet with water or another carrier to form a feed slurry that is then sequentially fed into a second mill. The multiple pass grinding operation, by selecting optimum size of the grinding stones for production of the intermediate feedstock and then for the production of the final minus 80-mesh to 200-mesh product, requires less energy than, for example, the single pass grinding operation.

For example grinding mills may be interconnected to sequentially grind a feedstock to a final fine grind state. A first grinding mill produces an intermediate feedstock of reduced size. The feedstock may be re-wet with water or other transport liquid to form a feed slurry which is then sequentially fed into a second mill, a a single pass though the first and second mill it has been discovered that the output is consistently a high yield of the desired final fine mesh output.

In a preferred embodiment, a fist grinding mill may be equipped, for example, with a 20 grit milling stone and fed with an input slurry average a 10 mesh feedstock comprising a filler material. This mill may be set for an optimum flow rat. The resulting ground filler slurry intermediate may be then re-liquified with water to form a uniform content slurry, as required to replace water loss by flashover steam during the first stage grinding. Before grinding, the filler slurry may be treated with a dispersant or surfactant in order to provide a higher yield during grinding. The dispersant is added in amounts to effectively disperse the filler, and these amounts are well within the skill of the instant invention.

In a preferred embodiment, a slurry of an elastomer is combined with the output filler slurry from the first grinding mill to form an intermediate slurry. This filler slurry may be split and fed into different mills using finer grit stones, for example, 24/36 grit stones Preferably, enhanced through put could be obtained by using 12 or 16 grit milling stones in the first stage mills and by using a larger mill such as a 14–24 inch diameter grinding stone mill as a first stage mill to feed a plurality of smaller mills utilizing the 24 to 36 grit stones. By splitting the grinding stage mill can be optimized for throughput. It can be seen that using a coarser stone produces a coarser output ground polymer, but that a given stone will produce an output having all output particles below a certain size. Accordingly, it is possible to achieve substantially all particles below the chosen minus 80 mesh size in only two stages, with proper choice of grinding stones and mill setup.

By the instant method, the total quantity of minus 80 mesh material has significantly increased in the two pass process whereas a converging series would indicate that at least three pass reduction of the material would be required to approximate a 90% reduction to an 80 mesh stage. This is based on the necessity of separating out and recirculating the 60 to 70 percent of the particles which are not reduced to an 80 mesh in passage through the first stage. This necessity of filtering, screening and recirculating the particles also significantly adds to the complexity of slurry handling. In the two step process, by contrast, all the slurry output from the first stage may be directly input to the second stage requiring only the addition of water to bring it to the desired liquified properties.

It can thus be seen that the method as disclosed as a two stage grinding operation significantly increases the through-put of the same number of machines over the current process of repeated single pass grinding, subsequent filtration, and re-grinding of the unreduced portion of the output. It has also been determined that inasmuch as the first stage grinders are optimized for a coarser output, the second stage grinders have a reduced power loading due to receiving a more uniform fine feedstock. As a result, the total power and amperage consumption of the grinders is less, for a given through-put, than if the four grinders were used for attempted single pass reduction as disclosed in the prior art.

The grinding stones can be brought into contact with (or spaced a distance apart from) each other. Choosing or maintaining the fixed position of the grinding stones with respect to each other is known in the art of colloid mills. Persons of skill in the art will readily understand how the slurry is input, at a feed pressure, to such grinding stones and how the spacing between the stones is to be adjusted and set. The grinding action generates heat, which may be controlled, modified or reduced by the particular additive in the slurry.

Impurities (e.g., metals, cords, reinforcing materials, etc.) can be removed from the elastomeric slurry compositions. For example, a magnet can be used to remove certain metallic impurities from the ground elastomer. Alternatively, impurities can be removed by passing the elastomeric slurry compositions through a screen that allows ¼-inch to ⅝-inch particles to pass through.

The grinding of the slurry (i.e., elastomer-additive slurry or elastomer slurry) may be conducted in a single pass or a multiple pass operation. According to an alternative embodiment, the grinding operation may be conducted in a single pass where the coarse particles that do not pass a screening operation can be feed to a slurry (i.e., elastomer-additive slurry or elastomer slurry) for re-grinding. According to any alternative or preferred embodiment, the grinding operation may be conducted in a multiple pass where two interconnected grinding mills sequentially grind the slurry to a final fine grind state as disclosed in U.S. Pat. No. 5,411.215 issued May 2, 1995 to Rouse for "TWO STAGE GRINDING" and incorporated herein by reference. According to the multiple pass grinding operation, a first grinding mill produces an intermediate feedstock of decreased size. The feedstock is re-wet with water or another carrier to form a feed slurry that is then sequentially fed into a second mill. The multiple pass grinding operation, by selecting optimum size of the grinding stones for production of the intermediate feedstock and then for the production of the minus 80-mesh to 200-mesh product, requires less energy than, for example, the single pass grinding operation.

Following the milling process, any one or more of the elastomer additives or carrier can be removed or separated from the product slurry. The term "product slurry" is defined as the compositional mixture that exits the grinding apparatus. All or a portion of any one additive or carrier can be removed. One method can include heating the slurry composition, e.g, with hot air, to flash off the additive or carrier. In some cases, the additive or carrier will "flashes off" as the surrounding pressure, e.g., atmospheric pressure, outside of the grinding apparatus is much lower. The flash minimizes the necessity of having a separate processing step of heating the ground particles, which saves energy costs of running a separator.

The carrier and the slurry (i.e., elastomer-additive slurry or elastomer slurry) can be separate. According to an alternative embodiment, the liquid from the slurry is removed to a capture region positioned outside the outer perimeter of the opposed grinding stones. According to a preferred embodiment the carrier is removed by a centrifuge action, such that the carrier is driven off from the slurry and the elastomer-additive particles or the elastomer particles remain.

The resulting modified elastomer composition obtained from the process of the invention has certain functional characteristics. Typically, the modified elastomer composition contains a very fine powder having a consistency similar to cooking flour.

The top and bottom variation of the softening point of the rosin-modified elastomer-additive product varies by about 1° Celsius. This range of softening variation is advantageous compared to the elastomer product that is not rosin-modified, which has a top and bottom softening point that various by about 10° Celsius.

Asphalt Case

By using one or more additives with the ground elastomer as described herein, a finely ground product is obtained that is unexpectedly superior in terms of many of its properties, particularly when used in asphalt products such as roofing, paving, building materials, sealants, etc. The final product obtained when using one or more additives as described herein will generally have a bulk density of 26–28 lbs.lsq. ft., have a specific gravity of from 1.13+\-0.02, have 100% of the particles finer than 175 microns or minus 80 mesh. Ground elastomer products prepared as described herein will typically resist phase separation, are storage stable, provide superior low temperature properties and have excellent high temperature stiffness. When the ground elastomer is mixed at a ratio of from 10–15% with asphalt such as WY Sour AC-20, AC-10, Venezu. AC-20, Saudi AC-20 and the like, by any known method, the storage stability of the asphalt product per ASTM D5892 (incorporated herein by reference) also known as the "Cigar Tube" storage stability test will typically range for the top (SP, top, ° F.) from 133–144 and at the bottom (SP, bottom, ° F.) from 134–156. The change in storage stability between the top and bottom sections generally remains substantially unchanged, that is, the AF from top to bottom will preferably be from 0–2 degrees. This is beneficial, inter alia, because the small change in storage stability of the asphalt will minimize cracking due to temperature changes since the layers of asphalt applied for example on a road, will generally age at the same rate. Asphalt including a ground elastomer with one or more of the instantly described additives will also be easier to store and ship.

Another process of the invention includes master batching reclaimed elastomer in asphalt, with or without additives, while milling elastomer. This process is particularly useful for batching scrap tire rubber with asphalt, and appears to be only possible with high softening point asphalt, known a mineral rubber. The presence of Acintal AD60, neutralized to be made dispersible in water, has a pronounced effect on the Brookfield Viscosity of asphalt containing scrap tire rubber. Milling of scrap rubber with mineral asphalt in the presence of Acintal AD60 provides a mix composition that is easier to blend, that is, the mix can be blended using relatively low shear conditions, and at lower process temperatures.

The present invention further is directed to premasticated materials which are packaged in slabs or as pellets or the like. The premasticated materials can also be used in downstream applications such as a compounding ingredient in asphalt or in other resin application. In further embodiments of the present invention, there are provided methods for converting one or more elastomers to a decreased size in a grinding apparatus. The method includes optionally soaking the elastomer in one or more additives.

The following examples are illustrative of those methods and compositions for reclaiming elastomers with the instant invention and are not intended to limit the instant invention.

EXAMPLES

The following examples are prepared by grinding in the presence of the indicated additives to approximately 80 mesh with a two-stage grinding method as described in U.S. Pat. No. 5,411,215 and incorporated herein by reference. All modifications are intended to be included within the scope of tie invention as defined in the appended claims.

Example 1

| Ingredient | Amount (parts by weight) |
| --- | --- |
| DAXAD ™ | 2 |
| Rubber Tire | 38 |
| Triton X 100 | 0 |
| NMP | 0 |
| Cresol | 0 |
| Anise Seed | 0 |
| Birch Bark | 0 |
| Water | 60 |

Example 2

| Ingredient | Amount (parts by weight) |
| --- | --- |
| DAXAD ™ | 0 |
| Rubber Tire | 39 |
| Triton X 100 | 1 |
| NMP | 0 |
| Cresol | 0 |
| Anise Seed | 0 |
| Birch Bark | 0 |
| Water | 60 |

Example 3

| Ingredient | Amount (parts by weight) |
| --- | --- |
| DAXAD ™ | 0 |
| Rubber Tire | 38 |
| Triton X 100 | 1 |
| NMP | 0 |
| Cresol | 0 |
| Anise Seed | 1 |
| Birch Bark | 0 |
| Water | 60 |

Example 4

| Ingredient | Amount (parts by weight) |
| --- | --- |
| DAXAD ™ | 0 |
| Rubber Tire | 40 |
| Triton X 100 | 0 |
| NMP | 0 |
| Cresol | 0 |
| Anise Seed | 0 |
| Birch Bark | 20 |
| Water | 140 |

Example 5

| Ingredient | Amount (parts by weight) |
| --- | --- |
| DAXAD ™ | 0 |
| Rubber Tire | 40 |
| Triton X 100 | 0 |
| NMP | 0 |
| Cresol | 0 |
| Anise Seed | 0 |
| Birch Bark | 20 |
| Water | 140 |

Example 6

| Ingredient | Amount (parts by weight) |
| --- | --- |
| DAXAD ™ | 0 |
| Rubber Tire | 38 |
| Triton X 100 | 0 |
| NMP | 1 |
| Cresol | 1 |
| Anise Seed | 0 |
| Birch Bark | 0 |
| Water | 60 |

Example 7

| Ingredient | Amount (parts by weight) |
| --- | --- |
| Water | 78 |
| DAXAD ™ | 2 |
| Carbon Black | 20 |
| Scrap Tire | 0 |
| Thermoplastic Polymer Latex | 0 |
| 40% solid 60% cold styrene butadiene rubber (SBR) | 0 |
| 40% Hot SBR | 0 |

Example 8

| Ingredient | Amount (parts by weight) |
| --- | --- |
| Water | 78 |
| DAXAD ™ | 2 |
| Carbon Black | 20 |
| Scrap Tire | 0 |
| Thermoplastic Polymer Latex | 100 |
| 40% solid 60% cold styrene butadiene rubber (SBR) | 0 |
| 40% Hot SBR | 0 |

Example 9

| Ingredient | Amount (parts by weight) |
| --- | --- |
| Water | 78 |
| DAXAD ™ | 2 |
| Carbon Black | 20 |
| Scrap Tire | 0 |
| Thermoplastic Polymer Latex | 0 |
| 40% solid 60% cold styrene butadiene rubber (SBR) | 0 |
| 40% Hot SBR | 100 |

Example 10

| Ingredient | Amount (parts by weight) |
| --- | --- |
| Water | 60 |
| DAXAD ™ | 2 |
| Carbon Black | 0 |
| Scrap Tire | 40 |
| Thermoplastic Polymer latex | 50 |
| 40% solid 60% cold styrene butadiene rubber (SBR) | 0 |
| 40% Hot SBR | 0 |

Example 11

| Ingredient | Amount (parts by weight) |
| --- | --- |
| Water | 60 |
| DAXAD ™ | 2 |
| Carbon Black | 0 |
| Scrap Tire | 40 |
| Thermoplastic Polymer Latex | 0 |
| 40% solid 60% cold styrene butadiene rubber (SBR) | 50 |
| 40% Hot SBR | 0 |

Example 12

| Ingredient | Amount (parts by weight) |
| --- | --- |
| Water | 78 |
| DAXAD ™ | 2 |
| Carbon Black | 20 |
| Scrap Tire | 0 |
| Thermoplastic Polymer Latex | 0 |
| 40% solid 60% cold styrene butadiene rubber (SBR) | 0 |
| 40% Hot SBR | 100 |

Example 13

10 Samples of ground tire rubber were prepared in accordance with the Two-Stage grinding method to approximately 80 mesh as described in U.S. Pat. No. 5,411,215, with the exception that during the grinding operation one or more additives were added in the weight percentages indicated in compositions A, B and C below. Comparative example 1 includes natural rubber ground to approximately 80 mesh in the absence of the additives and process of the invention. The ground products are mixed with an asphalt at either a 90:10 or 75:25 weight ratio. The properties of the asphalt are determined by various tests known to those skilled in the art. The attached tables set forth the properties obtained with the various samples.

As can be seen from the tables, the ground tire rubber with one or more of the additives described herein has superior properties when mixed in an asphalt as compared with the ground tire rubber alone. In particular, the softening points are much lower, the penetration properties are much lower, their viscosities are generally lower at all temperatures, their mandrel bend at cold temperatures is much higher, their load strain properties (elongation, tensile strength, etc.) were quite good. In fact, the ground tire rubber and additive mixtures had properties more similar to ground natural rubber as opposed to the ground tire rubber control.

|  | A | B | C |
|---|---|---|---|
| Scrap rubber | 66 | 66 | 66 |
| SBS | 33 |  |  |
| virgin rubber |  | 33 |  |
| wide spec rubber |  |  | 33 |

Scrap rubber is coground with material SBS, virgin rubber, and wide spec rubber in the above ratios to a particle size of approximately 80 mesh. The resulting mixtures A, B and C are added to neat asphalt at a temperature of 365° F. under low sheer conditions. The softening points of the modified asphalt ranged from 48° C. to 102° C., the penetration properties ranged from 15 to 120, the viscosities ranged from 500 cp to 5000 cp at a temperature of 135° C., the mandrel bend at cold temperatures (about 5° C.) ranged from 1% to 20%, and the load strain properties (elongation, tensile strength, etc.) ranged from 200% to 800%.

For the following example, terminal blending is measured through the separation test with DSR testing. For this project, the supplier requirement was that the $G^*/\sin \delta$ stiffness parameter measured in the DSR must be within 5% of the average value of the top and bottom portions. The % separation is calculated using the following equation:

Separation, $\% = 100 * \{(G^*/\sin \theta)_{max} - (G^*/\sin \theta)aY9\}/(G^*/\sin \theta)_{avg}$ wherein $G^*$ is the shear modulus, and $\theta$ is the phase angle, which is measured in the DSR test $(G^*/\sin \theta)_{max}$ represents the higher value of either the top or the bottom portion of the tube, and the $(G^*/\sin \theta)_{avg}$ is the average value of the two portions. Another requirement by some DOT specifications is a minimum of 3% tire rubber added.

The testing program focused on using a source asphalt, Citgo PG 67-22 which was tested with the following products identified above as additives: XP-277, XP-278, XP-378, XP-378A, XP-378C and XP-378A.

Different percentages were utilized in binder preparation. Testing on those formulations are tabulated. The interaction procedures of FIG. 1 presents an example binder of the final product, XP-378C, as tested and reported. Tested binder was produced at 4% concentration. This is one of the combinations that satisfied all three requirements. It was found that 4.5% binder concentration produced unexpectedly superior results.

A control run of the asphalt material PG 67-22 was made. FIG. 2 shows the results of testing on other asphalt compositions.

In all cases the rubber powder was tested for gradation and for its ThermoGravimetric Analysis (TGA). Additional testing on powder including Differential Scarming Calorimeter (DSC) was applied for verification purposes. Modifiers tested in this project were prepared using two different processes. Early products were treated through "Process-A".

Process A

Modifier components were prepared as outlined in Table 9. Specific additives were added to scrap rubber while grinding under a wet slurry process. For example, to make 6.0 lbs of XP-277, 4.0 lbs of whole tires and 2.0 lbs of Kraton 1184 were employed. Triton was then added during the grinding process to for the final ground product.

The scrap rubber and additive were mixed and then co-grinding was conducted using stones that were mounted in the grinding mill used for the process. A suitable quantity of fresh water was metered into the mixture during grinding, and the flow of water was adjusted as needed so that the components were always suspended and/or dispersed in the liquid. Modifier compound components were added to the grinding mill in batches of ¼ to ¹⁄₁₀ lb. until the entire quantity was added. The quantity of each addition was adjusted as needed to allow for better flow of the material through the stones. Triton (or other additional surfactant or additive as shown in Table 9) was added gradually in drops as the grinding process continued. The produced material was collected from the grinder outlet into a container. The obtained fine powder particle size was checked using a standard sieve with specified size. To further reduce the particle size of the powder, the outlet slurry that was collected in a tank was re-directed to the grinder for further particle size reduction. The process was continued until an acceptable particle size was achieved. The final powder was collected and centerfuged to separate the powder from the liquid component. At this time, the powder contained about 10% moisture. The powder was further dried to achieve the desired moisture content, which was less than 2% in this case. The powder was then pulvarized to the extent needed and, if necessary a partition agents (such as HI-SIL) was added to ensure storagability and flowability. The powder was then ready for packaging and use.

Other modifiers were produced using "Process-B". FIG. 1 is an example of a Process-B modifier.

Process B

The materials were made in the same as way as Process-A but the following steps were performed prior to co-grinding:

The components were prepared and mixed thoroughly. A two roll-mill was prepared with differential rotating speed so that one roll of the mill was set approximately 400% faster than the other roll on the mill. (It would be possible to set the speeds even at greater differences, i.e., greater than a 40% speed difference, if desired for any reason.) Using two rolls, one which is set at a speed of approximately 40% faster was desirable to ensure shearing action on the compound mixture. The components were sheared through the two roll mill until a coherent sheet was formed. The produced sheets were reduced in size using a pulvarized to achieve approximately 0.25 inch pellets. The pellets were then coground as outlined in Process A.

Interaction Procedures and Sampling

Binder interactions for this project were prepared on the ROSS mixer. The mixer has three independent blades, a shearing blade, a mixing blade and a stirring blade. Mixing, stirring and shearing speeds can be controlled through independent controllers. Temperature control is provided through an attached heating oil system that ensures accurate temperature control. Binders were either mixed and/or sheared depending on experimental settings. In cases of both mixing and shearing processing, asphalt is heated to the appropriate temperature. The modifier is then added to the asphalt and is mixed for 10 minutes or until temperature stabilizes. The binder is mixed for one hour. If shearing is to be applied, it is done for two hours. The rest of reaction time designated is used for mixing only.

The results of tests on these materials is set forth in Tables 1–7 and FIGS. 1–6.

Example 16

For example 16, PG 70-28 rubberized binder for chip seal applications was analyzed. Requirements were 4–8% modifier and a minimum 3% rubber. Interaction temperature was 190° C. Modifier gradation was set to 100% passing sieve #60. Final product, binder, met 97% solubility by AASHTO T-44.

FIG. 7 shows the PG 58-22 grade and a parameter of 1.82 kPa at 58° C. and a viscosity of 630 cp. Specific processing conditions are listed in Table 7 All modifier in this example were produced according to Process B defined above.

Also a "salt and pepper" test was run comparing Process B material to a traditional cryogenic material (i.e., material when the components were not coground or comasticated, but each component was ground separately then mixed together after being ground).

Salt and Pepper

Each component was individually cryogenically ground to the desired particle size. (Note that any particle size reduction method could be used as desired. The individual components were each separately dried, then mixed together to form "salt and pepper" (the black scrap rubber being the pepper and the other component which is generally light colored being the salt). Additional partioning agents were added. The cryogenic material had a composition of 50% RHC and 14% ash. Binder interactions were prepared using the ROSS mixer mentioned in Example 2.

The % separation was calculated as in Example 15.

Figure 15A:
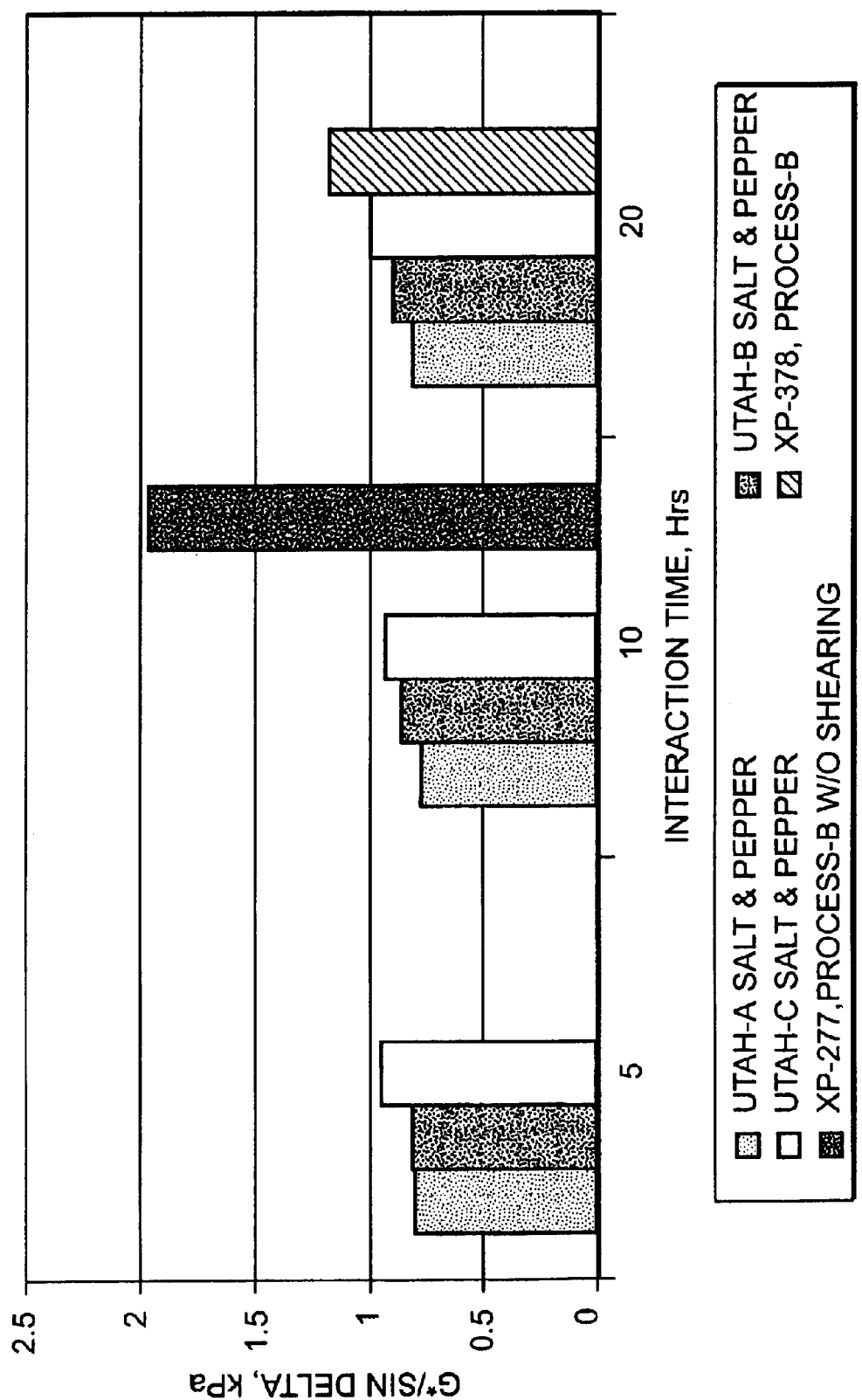
FIGS. 15a and 15b are graphs showing G*/sin delta and separation percentages for various compositions according to the present invention under standard test conditions.
Figure 15B:
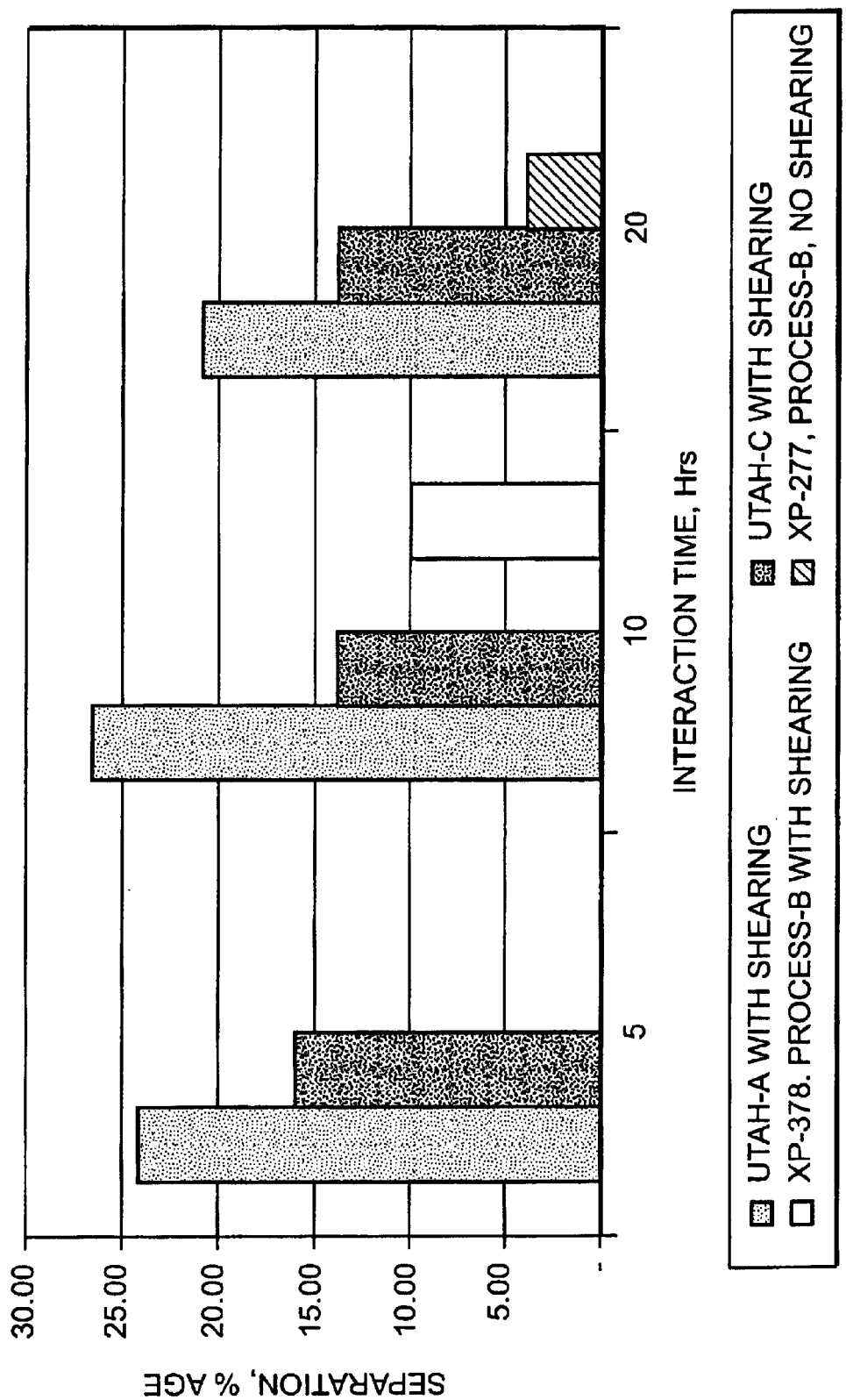
Figure 16:
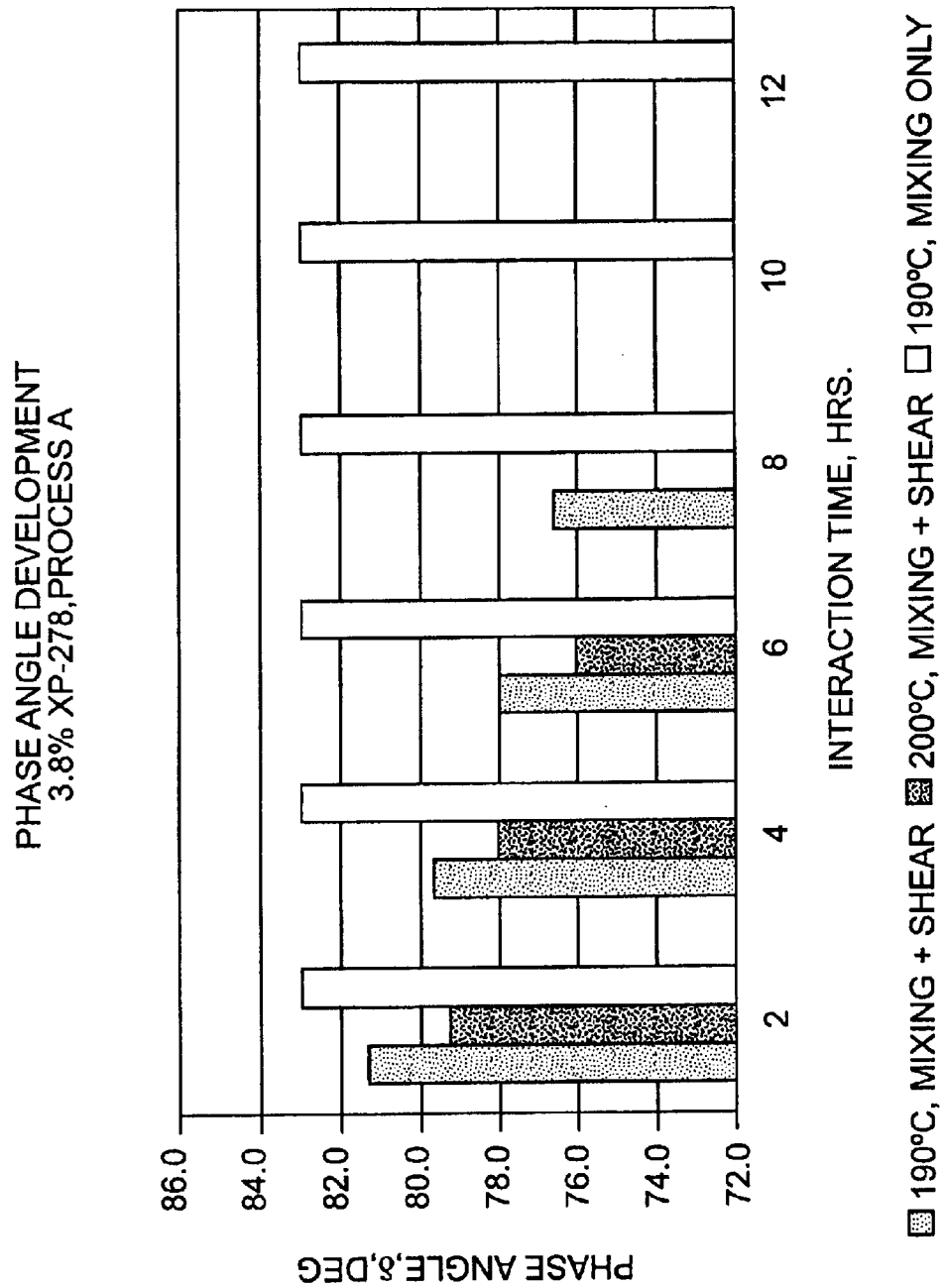
FIGS. 16–17 are phase angles (delta) of compositions tested under certain defined conditions according to the present invention.
Figure 17:
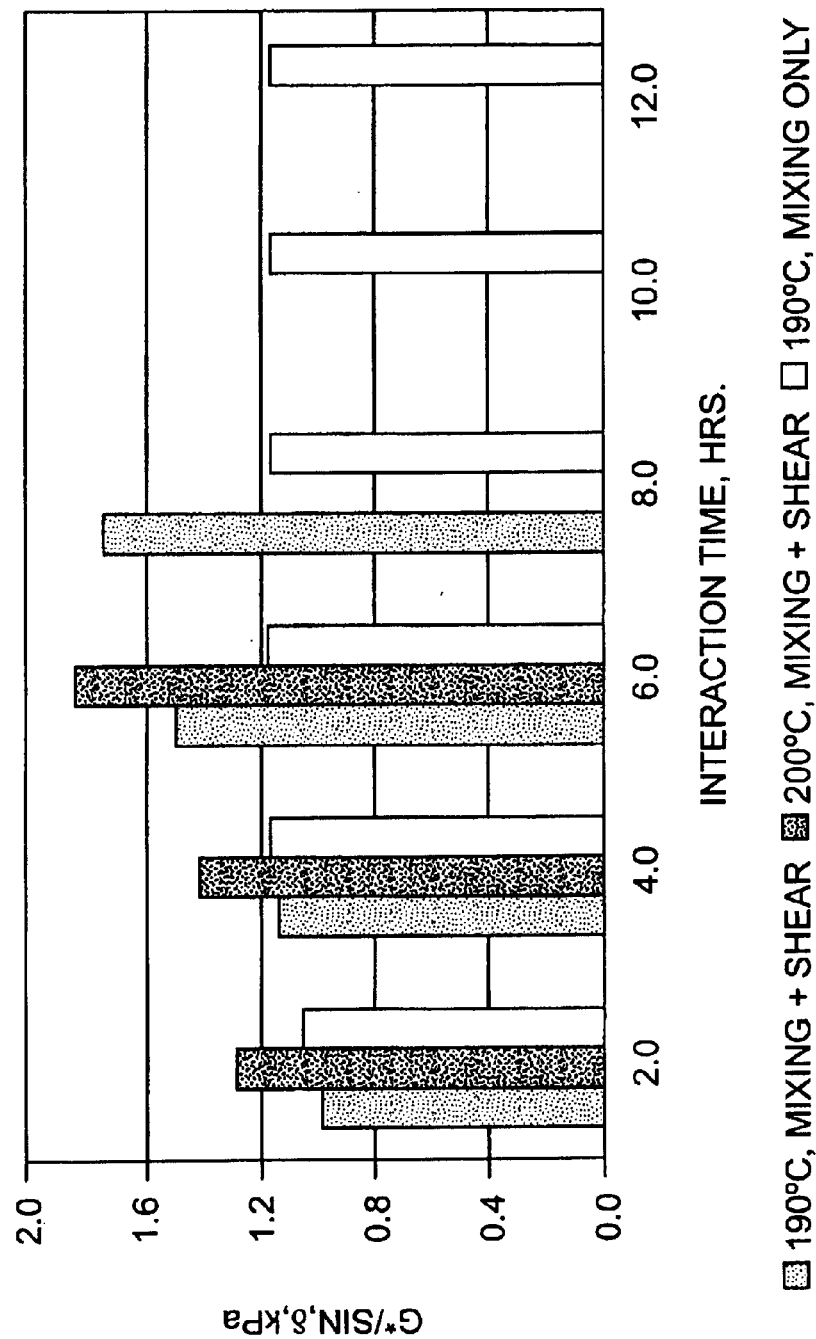
Figure 21:
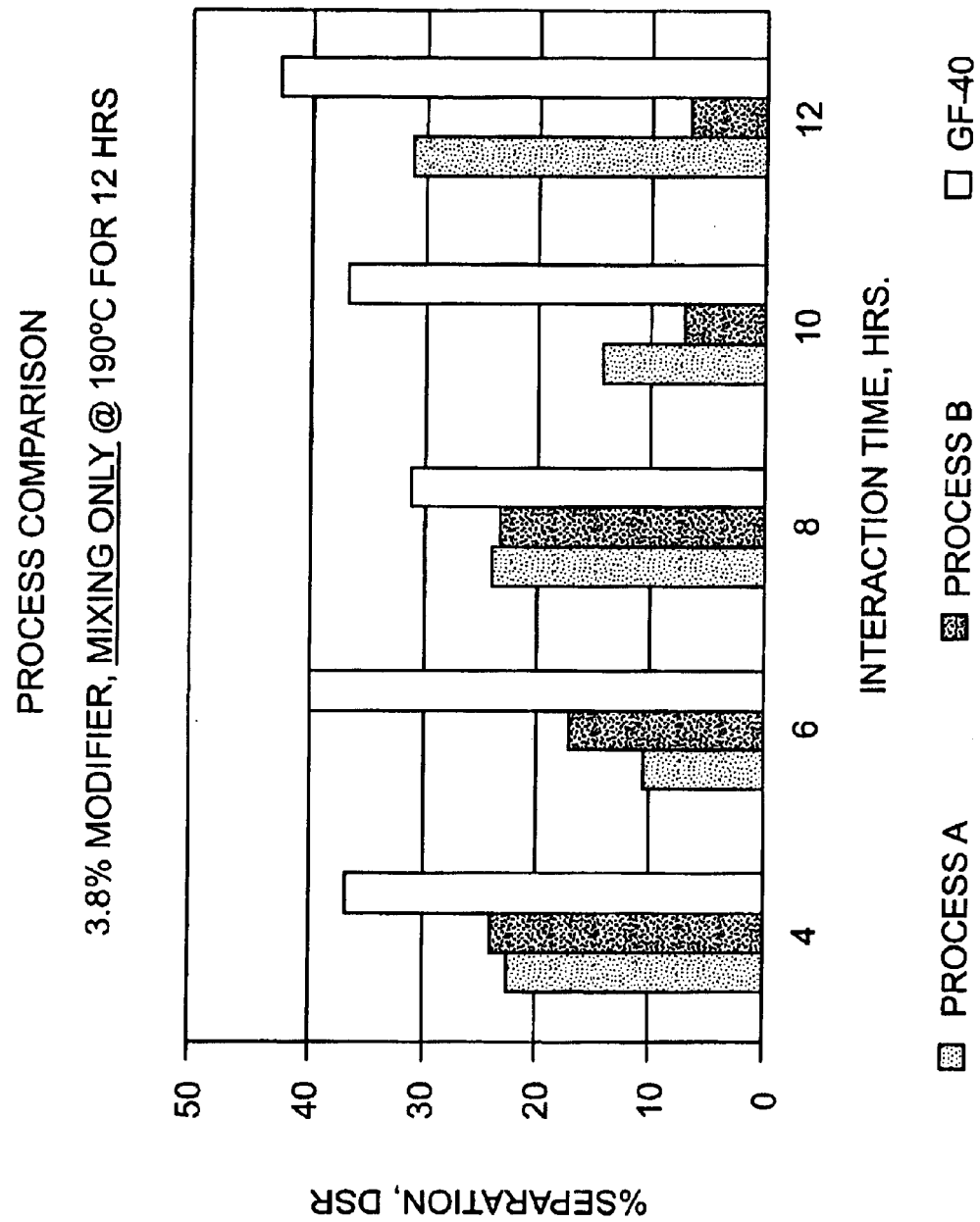
FIG. 21 is a graphic comparison of process A, B and GF-40 (ground rubber only) in terms of % separation.
Figure 23:
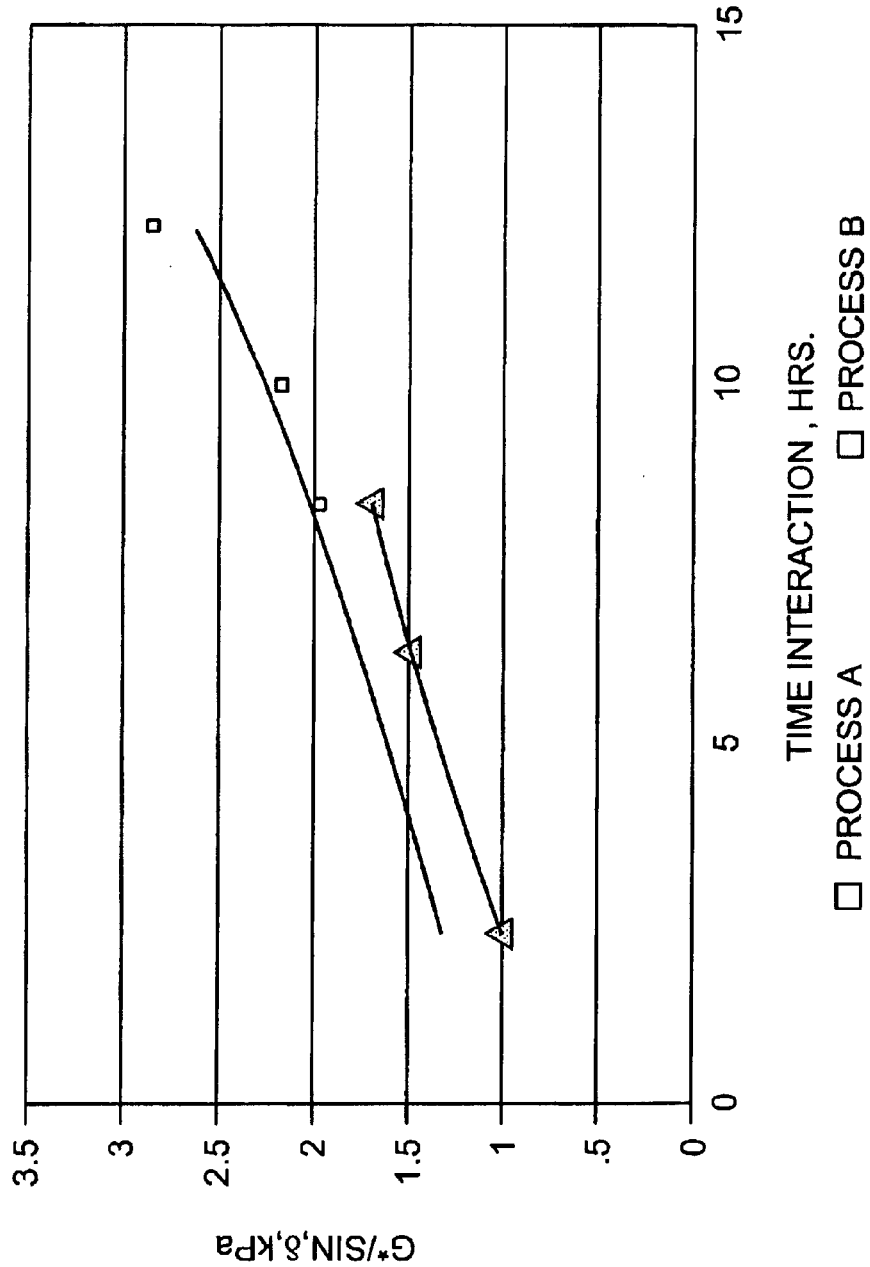
FIG. 23 is a graph comparing process A and process B in terms of various properties.
Figure 24:
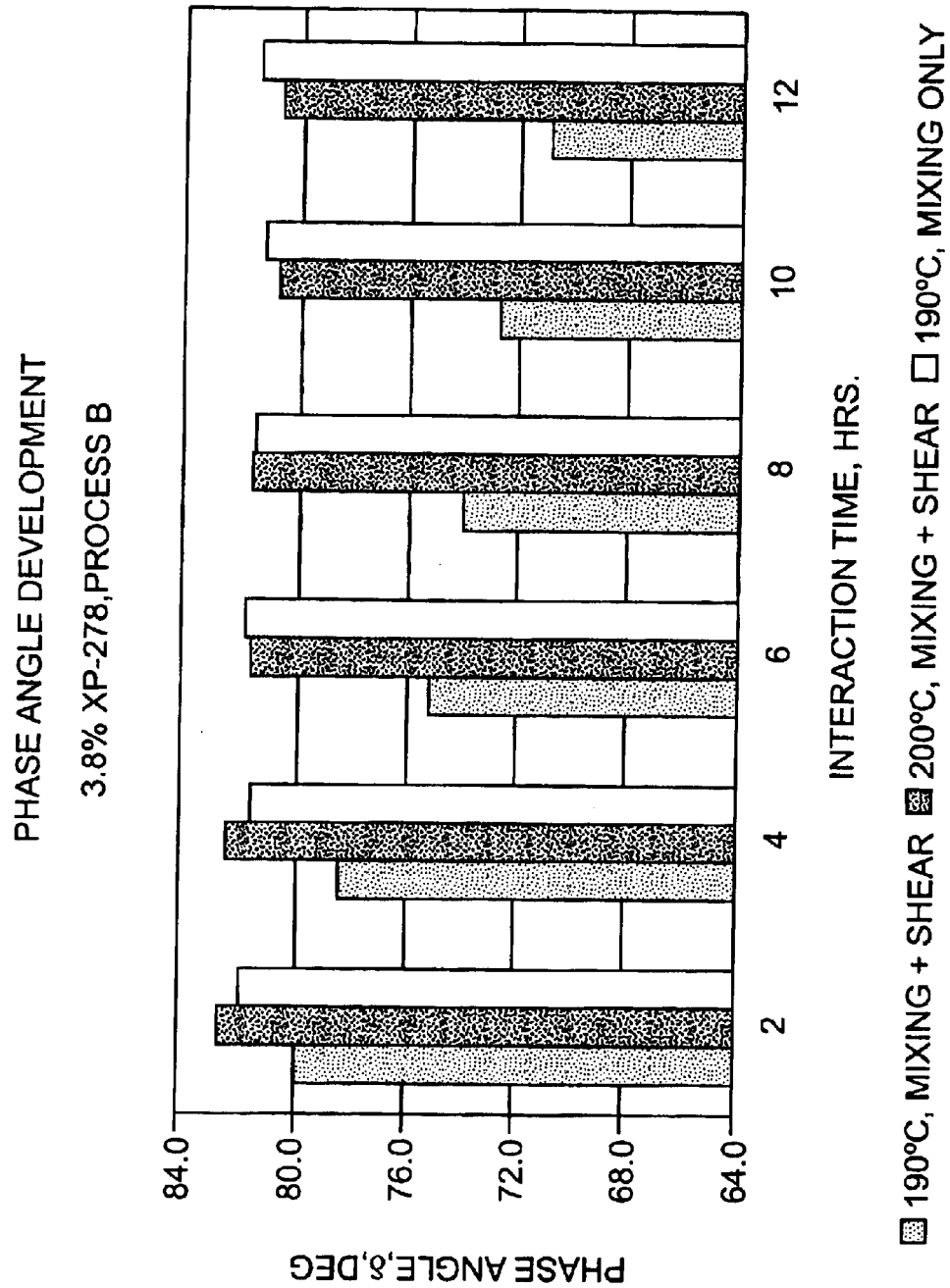
FIG. 24 is a graph showing phase angle (delta) under various process parameters according to the present invention.

The main advantages of Process B over a Salt and Pepper method were significantly lower separation and far better effectiveness. However, the salt and pepper method was far better than the cryogenic produced material. FIG. 15 shows Process B modifiers achieving higher parameters than salt and pepper materials. FIG. 16 shows Process B modifiers have less separation values as compared to any salt and pepper materials.

Table 1 below sets forth the composition of the various materials employed in Examples 15 and 16.

TABLE 1

| | |
|---|---|
| XP-278 | 66% GF80A co-grind with 33% Stereon 840 and 1% Triton |
| XP-379 | 60% GF80A co-grind with 40% Stereon 840 and 1% Triton XP379F uses Finaprene for Stereon 840A |
| XP-277 | 66% GF80A co-grind with 33% Kraton 1184 and 1% Triton |
| XP-378 | 75% GF80A with 25% Kraton 1184 and 1% Triton. 378B has SR8296 |
| XP-378A | 75% GF80A With 25% Kraton 1184 and 1% Triton and Stereon 840 |
| XP-378C | 75% GF80A with 25% Kraton 1184 and 1% Triton and Citgo SBS |
| UTAH-40 | 9.5% Acetone with 51% RHC snd 26.5% Carbon Black and 13% ASH |
| UTAH-A | 9.8% Acetone wtth 73.25% RHC and 17% Carbon Black and 0.4% ASH |

TABLE 1-continued

| | |
|---|---|
| UTAH-B | 9.9% Acetone with 72.5% RHC and 0.9% ASH and 16.8% Carbon Black |
| UTAH-C | 11.2% Acetone with 72% RHC and 0.4% ASH and 16.7% Carbon Black |

What is claimed is:

1. A method of making a slurry with reclaimed milled elastomer, the method comprising:

providing a milling composition, wherein the milling composition comprises an elastomer, a wetting agent, and a devulcanizing effective amount of an aromatic alcohol selected from the group consisting of phenol and creosol; and grinding the milling composition.

2. The method of claim 1 wherein said aromatic alcohol comprises cresol provided in the form of anise seed or birch bark.

3. The method of claim 1 wherein said slurry further comprises one or more additives selected from the group consisting of resin acids, fatty acids, oligomers and copolymers.

4. The method of claim 1 wherein said slurry further comprises one or more additives selected from the group consisting of rosin acid, polymerized rosin acid, esters of rosin acid, dispersions of rosin acid, dispersions of esters of rosin acid, copolymers of rosin acid, disproportionated rosin acid, hydrogenated rosin acid, 9-anthracene carboxylic acid, 2-ethylhexanoic acid, and acetal R-type acids.

5. A method of making a slurry with reclaimed milled elastomer, the method comprising:

providing a milling composition, wherein the milling composition comprises an elastomer, a wetting agent, and creosol extracted from anise seeds, birch bark, or a mixture thereof; and grinding the milling composition.

6. The method of claim 5 wherein said wetting agent includes pyrrolidone or a pyrrolidone derivative.

7. The method of claim 5 wherein said wetting agent is N-methyl-2-pyrrolidone.

8. The method of claim 5 wherein the milling composition further comprises phenol.

9. The method of claim 5 wherein said slurry further comprises one or more additives selected from the group consisting of resin acids, fatty acids, oligomers and copolymers.

10. The method of claim 5 wherein the milling composition further comprises one or more additives selected from the group consisting of tetrahydrofuran, dimethyl formamide and fatty amines.

11. The method of claim 5 wherein the milling composition further comprises one or more additives selected from the group consisting of water miscible dispersing agents and surfactants.

12. The method of claim 5 wherein the milling composition further comprises one or more additives selected from the group consisting of resins and rosins.

13. The method of claim 5 wherein the milling composition further comprises one or more additives selected from the group consisting of rosin acid, polymerized rosin acid, esters of rosin, acid, dispersions of rosin acid, dispersions of esters of rosin acid, copolymers of rosin acid, disproportionated rosin acid, hydrogenated rosin acid, 9-anthracene carboxylic acid, 2-ethylhexanoic acid, and acetal R-type acids.

14. The method of claim 5 further comprising adding a carrier to the milling composition.

15. A composition comprising:
ground reclaimed elastomeric particles;
a wetting agent; and
a devulcanizing effective amount of an aromatic alcohol selected from the group consisting of phenol and creosol.

16. The composition of claim 15 wherein said aromatic alcohol comprises a fibrous material selected from ground anise seeds, ground birch bark, or a mixture thereof.

17. The composition of claim 15 wherein said wetting agent includes pyrrolidone or a pyrrolidone derivative.

18. The composition of claim 15 wherein the wetting agent is N-methyl-2-pyrrolidone.

19. The composition of claim 15 further comprising a sufficient amount of water to form a slurry containing the ground reclaimed elastomeric particles.

20. A ground reclaimed particle comprising an elastomer devulcanized by an aromatic alcohol selected from the group consisting of phenol and creosol and a wetting agent.

21. An asphalt composition comprising elastomeric particles that were reduced in particle size in the presence of a wetting agent and a devulcanizing effective amount of an aromatic alcohol selected from the group consisting of phenol and creosol.

22. The asphalt composition of claim 21 further comprising a fibrous material selected from ground anise seeds, ground birch bark, or a mixture thereof.

23. A method of making a slurry with reclaimed milled elastomer, the method comprising:
providing a milling composition, wherein the milling composition comprises an elastomer, a wetting agent comprising pyrrolidone or a pyrrolidone derivative, and a devulcanizing effective amount of an aromatic alcohol; and
grinding the milling composition.

24. A method of making a slurry with reclaimed milled elastomer, the method comprising:
providing a milling composition, wherein the milling composition comprises an elastomer, a wetting agent comprising N-methyl-2-pyrrolidone, and a devulcanizing effective amount of an aromatic alcohol; and
grinding the milling composition.

25. A method of making a slurry with reclaimed milled elastomer, the method comprising:
providing a milling composition, wherein the milling composition comprises an elastomer, a wetting agent, a devulcanizing effective amount of an aromatic alcohol, and one or more additives selected from the group consisting of resin acids, fatty acids, oligomers and coplymers; and
grinding the milling composition.

26. A method of making a slurry with reclaimed milled elastomer, the method comprising:
providing a milling composition, wherein the milling composition comprises an elastomer, a wetting agent, a devulcanizing effective amount of an aromatic alcohol, and one or more additives selected from the group consisting of tetrahydrofuran, dimethyl formamide and fatty amines; and
grinding the milling composition.

27. A method of making a slurry with reclaimed milled elastomer, the method comprising:
providing a milling composition, wherein the milling composition comprises an elastomer, a wetting agent, a devulcanizing effective amount of an aromatic alcohol, and one or more additives selected from the group consisting of water miscible dispersing agents and surfactants; and
grinding the milling composition.

28. A method of making a slurry with reclaimed milled elastomer, the method comprising:
providing a milling composition, wherein the milling composition comprises an elastomer, a wetting agent, a devulcanizing effective amount of an aromatic alcohol, and one or more additives selected from the group consisting of resins and rosins; and
grinding the milling composition.

29. A method of making a slurry with reclaimed milled elastomer, the method comprising:
providing a milling composition, wherein the milling composition comprises an elastomer, a wetting agent, a devulcanizing effective amount of an aromatic alcohol, and one or more additives selected from the group consisting of resins and rosins;
adding a carrier to said milling composition; and
grinding the milling composition.

* * * * *